US011008444B2

(12) United States Patent
Ingratta et al.

(10) Patent No.: US 11,008,444 B2
(45) Date of Patent: May 18, 2021

(54) TIRES COMPRISING POLYINDANE RESINS AND USES THEREOF

(71) Applicant: Eastman Chemical Company, Kingsport, TN (US)

(72) Inventors: Mark William Ingratta, Copley, OH (US); Soumendra Kumar Basu, Copley, OH (US); Mark Stanley Pavlin, Kingsport, TN (US); Joseph Alexander Deloach, Jonesborough, TN (US); George Joseph Kutsek, South Park, PA (US); Wei Min Cheng, Pittsburgh, PA (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 15/845,182

(22) Filed: Dec. 18, 2017

(65) Prior Publication Data

US 2018/0171124 A1 Jun. 21, 2018

Related U.S. Application Data

(60) Provisional application No. 62/436,094, filed on Dec. 19, 2016.

(51) Int. Cl.

| C08L 9/06 | (2006.01) |
| C08F 212/34 | (2006.01) |
| C08F 110/10 | (2006.01) |
| B60C 1/00 | (2006.01) |
| C08F 12/34 | (2006.01) |
| C08F 212/08 | (2006.01) |
| C08L 91/00 | (2006.01) |
| C08K 3/36 | (2006.01) |
| C08K 5/548 | (2006.01) |
| C08L 45/00 | (2006.01) |
| C08L 9/00 | (2006.01) |

(52) U.S. Cl.
CPC ............. *C08L 9/06* (2013.01); *B60C 1/0016* (2013.01); *B60C 1/0025* (2013.01); *C08F 12/34* (2013.01); *C08F 110/10* (2013.01); *C08F 212/08* (2013.01); *C08F 212/34* (2013.01); *C08K 3/36* (2013.01); *C08K 5/548* (2013.01); *C08L 9/00* (2013.01); *C08L 45/00* (2013.01); *C08L 91/00* (2013.01); *C08F 2810/40* (2013.01); *C08L 2205/025* (2013.01); *C08L 2205/03* (2013.01)

(58) Field of Classification Search
CPC ...... C08F 12/34; C08F 212/34; C08F 212/08; C08F 110/10; C08F 2810/40; C08L 9/06; C08L 2205/03; C08L 2205/025; C08L 9/00; C08L 45/00; C08L 91/00; B60C 1/0025; B60C 1/0016; C08K 3/36; C08K 5/548

USPC ......................................................... 524/518
See application file for complete search history.

(56) References Cited

U.S. PATENT DOCUMENTS

| 3,567,786 A | 3/1971 | Bostian et al. |
| 4,205,160 A | 5/1980 | Gloth et al. |
| 4,403,088 A | 9/1983 | Smith et al. |
| 4,499,248 A | 2/1985 | Jalics |
| 4,528,413 A | 7/1985 | Colvin et al. |
| 4,537,930 A | 8/1985 | Bussink et al. |
| 5,049,615 A | 9/1991 | Chu et al. |
| 5,350,604 A | 9/1994 | Crivello |
| 5,684,091 A | 11/1997 | Maly et al. |
| 5,985,963 A | 11/1999 | D'Sidocky et al. |
| 6,153,721 A | 11/2000 | McCarthy et al. |
| 6,184,285 B1 | 2/2001 | Hatfield et al. |
| 6,310,154 B1 | 10/2001 | Babcock et al. |
| 6,346,296 B1 | 2/2002 | McCarthy et al. |
| 6,465,557 B1 | 10/2002 | De Keyzer et al. |
| 6,492,436 B2 | 12/2002 | Howe et al. |
| 6,657,000 B1 | 12/2003 | De Keyzer et al. |
| 7,402,646 B2 | 7/2008 | Ittel et al. |
| 2003/0069384 A1 | 4/2003 | McCarthy et al. |
| 2003/0153680 A1 | 8/2003 | McBride et al. |
| 2008/0096787 A1 | 4/2008 | Cauley et al. |
| 2011/0067799 A1 | 3/2011 | Mussig et al. |
| 2014/0228519 A1 | 8/2014 | Nakayama et al. |

(Continued)

FOREIGN PATENT DOCUMENTS

| CA | 751995 A | 1/1967 |
| CN | 101979255 A | 2/2011 |

(Continued)

OTHER PUBLICATIONS

Notification of Transmittal of the International Search Report and the Written Opinion of the International Searching Authority, or the Declaration International Application No. PCT/US17/67220 dated Mar. 8, 2018.

(Continued)

*Primary Examiner* — Angela C Scott
(74) *Attorney, Agent, or Firm* — Polly C. Owen

(57) ABSTRACT

The present invention is generally related to various types of compositions that comprise a polyindane resin. In particular, the polyindane resins may be utilized in various polymer-based and elastomer-based formulations in order to enhance several properties and characteristics of those formulations. More specifically, elastomeric compositions are provided that comprise at least one polyindane resin, which may be used to replace or enhance the functionality of existing hydrocarbon resins used in elastomeric formulations. The elastomeric compositions may be used to produce various tire components.

11 Claims, 2 Drawing Sheets

(56) References Cited

U.S. PATENT DOCUMENTS

| | | | |
|---|---|---|---|
| 2016/0159147 A1 | 6/2016 | Isitman et al. | |
| 2016/0304756 A1 | 10/2016 | Cohn et al. | |
| 2016/0339743 A1* | 11/2016 | Abad | C08L 53/02 |

FOREIGN PATENT DOCUMENTS

| | | |
|---|---|---|
| CN | 103435872 A | 12/2013 |
| EP | 0432696 B1 | 8/1997 |
| GB | 850363 | 10/1960 |

OTHER PUBLICATIONS

Notification of Transmittal of the International Search Report and the Written Opinion of the International Searching Authority, or the Declaration International Application No. PCT/US17/67209 dated Mar. 8, 2018.

H. Brunner, et al.; "The Preparation and Structure of Linear Polymers from Di-isopropenylbenzenes"; Journal of Polymer Science, vol. 28, Issue No. 118, 1958, pp. 629-631.

ASTMD1646; Standard Test Methods for Rubber—Viscosity, Stress Relaxation, and Pre-Vulcanization Characteristics (Mooney Viscometer); Published Jan. 2018.

ASTMD6601; "Standard Test Method for Rubber Properties—Measurement of Cure and After-Cure Dynamic Properties Using a Rotorless Shear Rheometer"; Published Dec. 2015.

ASTMD5289; "Standard Test Method for Rubber Property—Vulcanization Using Rotorless Cure Meters" Published Nov. 2017.

ASTMD2240; "Standard Test Method for Rubber Property—Durometer Hardness"; Published Jan. 2016.

ASTMD412; "Standard Test Methods for Vulcanized Rubber and Thermoplastic Elastomers Tension"; Published Dec. 2016.

ASTMD624; "Standard Test Method for Tear Strength of Conventional Vulcanized Rubber and Thermoplastic Elastomers"; Published Mar. 2012.

ASTMD5963; Standard Test Method for Rubber Property—Abrasion Resistance (Rotary Drum Abrader); Published Sep. 2015.

Mitin, Yu. V., et al..; "The Polymerization of Some Compounds Containing Two Isopropenyl Groups"; Doklady Akademii Nauk SSSR, (1957), 115, 97, pp. 671-674.

Lutz, Pierre et al.; "Anionic Polymerization and Copolymerization of 1,3- and 1,4-Diisopropenylbenzene"; Makromol. Chem. 183, (1982), pp. 2787-2797.

ASTMD3236; "Standard Test Method for Apparent Viscosity of Hot Melt Adhesives and Coating Materials"; Published May 2015.

ASTMD6493; "Standard Test Methods for Softening Point of Hydrocarbon Resins and Rosin Based Resins by Automated Ring-and-Ball Apparatus"; Published Dec. 2015.

ASTMD638; "Standard Test Method for Tensile Properties of Plastics"; Published Mar. 2015.

ATSMD395-14; "Standard Test Methods for Rubber Property—Compression Set"; Published Aug. 2014.

New co-pending U.S. Appl. No. 15/845,222, filed Dec. 18, 2017.

Non-Final Office Action dated Apr. 29, 2019 received in U.S. Appl. No. 15/845,222.

Final Office Action dated Apr. 10, 2020 received in U.S. Appl. No. 15/845,222.

* cited by examiner

Where  A = aromatic moiety
       I = isopropyl group
       U = isopropenyl group

TIRES COMPRISING POLYINDANE RESINS AND USES THEREOF

RELATED APPLICATIONS

This application claims priority to U.S. Provisional Patent Application No. 61/937,024 filed on Dec. 19, 2016, which is incorporated herein by reference.

BACKGROUND

1. Field of the Invention

The present invention is generally related to elastomeric compositions for tire components. More particularly, the present invention is generally related to elastomeric compositions comprising a performance-enhancing hydrocarbon resin.

2. Description of the Related Art

Tires perform a particularly important role in driving safety and performance. They are the connection of the car to the road and are responsible for delivering the desired input by the driver. As such, the performance demands on tires and tire tread performance are ever increasing to improve traction, fuel economy, and longevity. One way to adjust the performance of a tire tread compound involves the incorporation of hydrocarbon resins into the elastomeric compositions forming the tire tread. Hydrocarbon resins help to modify the viscoelastic properties of the tread compound, typically to improve wet grip at the expense of rolling resistance.

A variety of commercially-available hydrocarbon resins exist that are useful for modifying thermoplastic elastomeric polymers that constitute the major component of automotive vehicle tires and many other useful products. There is, however, an ongoing need to improve the performance of these various products. One way to enhance performance is to modify the base elastomer with hydrocarbon resins having superior properties, especially resins with low molecular weights, high glass transition temperatures, excellent oxidative and thermal stabilities, low color, and low odor. These hydrocarbon resins generally are the products of the polymerization of various olefins and mixtures of olefins made available by the chemical industry. For example, many of these resins, such as $C_5$ and $C_9$ resin oil, may be byproducts of crude oil refining, in particular the byproducts produced during the cracking of naphtha. However, due to the rapid conversion rate of crackers, these byproducts are now in severely restricted supply and the problem of $C_5$ and $C_9$ resin oil availability is likely chronic. Thus, it is also important that these new performance resins be derived from cost-effective starting materials available in adequate quantity for the foreseeable future, such as commodity aromatic and olefinic feedstocks including, for example, benzene, toluene, ethylene, propylene, and the like.

SUMMARY

One or more embodiments of the present invention concern a tire component comprising an elastomeric composition, wherein the elastomeric composition comprises a polyindane resin.

One or more embodiments of the present invention concern a tire component comprising an elastomeric composition, wherein the elastomeric composition comprises at least one elastomer, a polyindane resin, and one or more fillers.

One or more embodiments of the present invention concern a method for forming a tire component. Generally, the method comprises: (a) producing an elastomeric composition comprising a polyindane resin; and (b) forming the tire component from the elastomeric composition.

BRIEF DESCRIPTION OF THE FIGURES

Embodiments of the present invention are described herein with reference to the following drawing figures, wherein.

DETAILED DESCRIPTION

Vehicle tire treads are required to have both high hysteresis to impose good traction properties for safety, as well as low hysteresis for rolling resistance and fuel economy. This opposing balance of traction and rolling resistance is a constant trade-off for a tire compounder when designing new tires. Typical solutions to solve this problem consist of changes made to the elastomer microstructure, filler size and shape, or the elastomer-filler interaction. Each of these changes typically results in an improvement in one area at the cost of another.

In the present invention, an elastomeric composition is provided whereby tire tread elastomers and fillers are blended with a polyindane hydrocarbon resin to improve the compound performance. Use of a polyindane resin results in improved traction properties and rolling resistance compared to conventional hydrocarbon resins.

As discussed below in further detail, the present invention is generally related to elastomeric compositions comprising at least one polyindane resin. In various embodiments, the elastomeric compositions of the present invention may be used to produce various tire components. As discussed below, the polyindane resins can be used to produce tire tread compounds that exhibit significantly improved wet grip with no detriment to rolling resistance.

In particular, the polyindane resins of the present invention are especially suited for use in elastomeric formulations due to their good compatibility with different elastomer blends. In cases where the compatibility of a hydrocarbon resin with the elastomers benefits from having a high aliphatic character, the polyindane resins can be partially or even fully hydrogenated.

Figure 1:
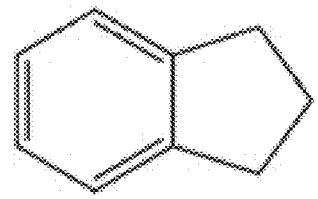
FIG. 1 depicts the chemical structure of indane.
Figure 2:
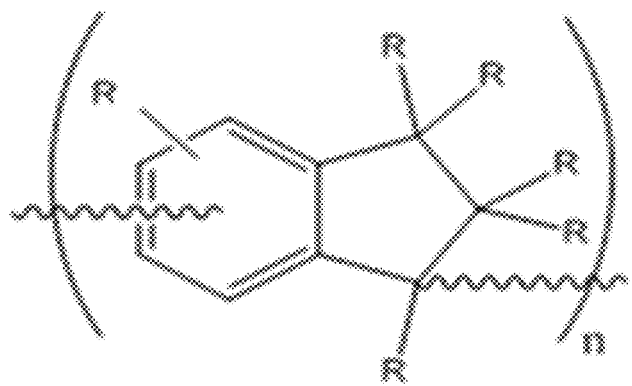
FIG. 2 depicts the general structure of a polyindane polymer.
Figure 3:
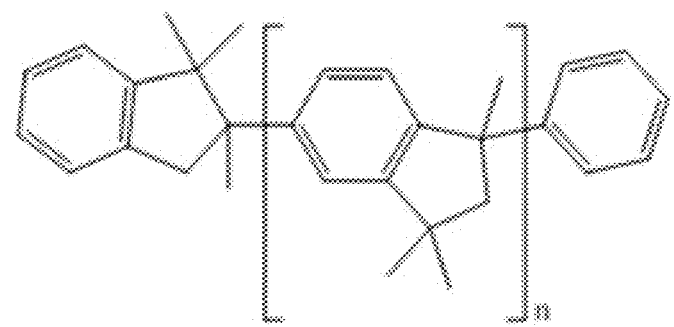
FIG. 3 depicts a polymer structure resulting from the reaction of 1,3-diisopropenylbenzene and a minor portion of AMS.

FIG. 1 shows the chemical structure of indane, the parent compound of the polyindane resins of the present invention. The term "indane," as used herein, is a common shorthand for the compound depicted in FIG. 1, which has a five-membered aliphatic ring fused to a six-membered aromatic ring. Indane has a chemical formula of $C_9H_{10}$ and its IUPAC name is "2,3-dihydro-1H-indene." As used herein, a "polyindane" refers to any polymer that contains indane rings as the primary chain component, which are linked to one another via single bonds that connect a carbon atom of the five-membered aliphatic ring to a carbon atom of the six-membered aromatic ring. FIG. 2 depicts the general structure of a polyindane polymer, wherein "R" is hydrogen, alkyl, or aryl. In various embodiments, "R" is preferably, but not restricted to, either hydrogen or a methyl group. FIG. 3 depicts a specific example of a polyindane polymer.

Generally, the molecular weight ("MW"), aromaticity ("AR"), and glass transition temperature ("$T_g$") are some of the most important properties of the polyindane resins.

In various embodiments, the polyindane resins may have $T_g$ values of at least 10, 20, 30, 40, 45, or 50° C. and/or not more than 150, 130, 120, 110, 100, or 90° C. For instance, the polyindanes can have $T_g$ values in the range of 10 to 150° C., 40 to 130° C. or 50 to 90° C. The $T_g$ is measured using differential scanning calorimetry ("DSC").

In various embodiments, the polyindane resins may comprise a number average molecular weight ("$M_n$") in the range of about 300 to 3,000 g/mol or 400 to 1,000 g/mol. In other embodiments, the polyindane resins may comprise a weight average molecular weight ("Mw") in the range of 300 to 5,000 g/mol, 300 to 4,000 g/mol, or 500 to 2,000 g/mol. In yet other embodiments, the polyindane resins may comprise a z-average molecular weight ("$M_z$") in the range of 300 to 5,000 g/mol, 400 to 4,000 g/mol, or 1,000 to 3,000 g/mol. In still yet other embodiments, the polyindane resins may comprise a polydispersity ("$M_w/M_n$") in the range of 1.1 to 1.8, 1.2 to 1.7, or 1.3 to 1.6. The molecular weights are measured using gel permeation chromatography ("GPC") against polystyrene standards.

The aromaticity of the polyindane resins can be measured by integrating the area of the aromatic proton region of the nuclear magnetic resonance ("NMR") spectrum of the resin or by the "mixed methylcyclohexane cloud point" temperature ("MMAP") of the resin, where a lower MMAP value indicates higher aromaticity. The MMAP of the polyindane resins may vary depending on the degree of hydrogenation. For instance, polyindane resins that have not been subjected to hydrogenation may exhibit a MMAP cloud point in the range of 0 to 50° C. In various embodiments, the polyindane resins can exhibit a mixed methylcyclohexane cloud point temperature (MMAP) of at least −20° C. and not more than 100° C.

In various embodiments, the polyindane resins can be partially or fully hydrogenated.

As discussed further below, the polyindane resins of the present invention may be produced from cost-effective starting materials. For example, treatment of a polyisopropenyl-substituted aromatic compound with an acid catalyst can provide a hydrocarbon solvent-soluble oligomer with indane chain units having both a high softening point and a low molecular weight. These amorphous solids ("resins") are suitable for use with common elastomers and oil, especially those elastomers that serve as the base component of adhesives, sealants, and the like. In various embodiments, polyisopropenyl-substituted aromatic compounds may be advantageously co-reacted with mono-isopropenyl-substituted aromatic compounds, including alpha-methylstyrene and other mono-olefins, such as styrene, to adjust the molecular weight and softening point of the resulting polyindanes. Hydrocarbon resins prepared in this manner may be compatible with common styrene-based elastomers and may be partially or fully hydrogenated to provide resins that have good compatibility with polyethylene-based and polypropylene-based olefin copolymer elastomers.

The Elastomeric Compositions

As discussed above, the elastomeric compositions of the present invention can comprise at least one polyindane resin. Furthermore, the elastomeric compositions of the present invention can be used to produce various tire components such as, for example, a tire tread, tire subtread, tire undertread, body plies, belts, overlay cap plies, belt wedges, shoulder inserts, tire apex, tire sidewalls, and/or bead fillers. In certain embodiments, the elastomeric compositions of the present invention may be used to produce a tire tread, tire subtread, tire undertread, and/or tire sidewall.

In various embodiments, the elastomeric compositions comprise at least 1, 2, 3, 4, 5, 6, 7, 8, 9, or 10 and/or not more than 100, 50, 40, 30, or 20 phr of at least one polyindane resin. For example, the elastomeric compositions can comprise 1 to 50 phr, 3 to 60 phr, 3 to 30 phr, or 5 to 20 phr of at least one polyindane resin. The amount of the polyindane resin in the elastomeric composition can fluctuate depending on the desired properties of the elastomeric composition.

The elastomeric compositions of the present invention can comprise at least one elastomer. The term "elastomer," as used herein, can be used interchangeably with the term "rubber." Due to the wide applicability of the process described herein, the polyindane resins can be employed with virtually any type of elastomer. For instance, the elastomers utilized in this invention can comprise a natural rubber, a modified natural rubber, a synthetic rubber, and mixtures thereof. In various embodiments, the elastomers can comprise styrene-butadiene rubber (SBR), butadiene rubber (BR), ethylene propylene diene polymers (EPDM), ethylene-propylene copolymers (EP), styrene-butadiene-styrene triblock copolymers (SBS), styrene-isoprene-styrene (SIS), butyl rubber, halobutyl rubbers (IIR and XIIR), or combinations thereof. In certain embodiments, the elastomer comprises a blend of SBR/BR. The elastomer makes up 100 parts per hundred rubber ("phr") and is the reference for all other ingredients.

In certain embodiments, the elastomeric composition of the present invention can comprise one or more fillers. The fillers can comprise any filler that can improve the thermophysical properties of the elastomeric composition (e.g., modulus, strength, and expansion coefficient). For example, the fillers can comprise silica, carbon black, clay, alumina, talc, mica, discontinuous fibers including cellulose fibers and glass fibers, aluminum silicate, aluminum trihydrate, barites, feldspar, nepheline, antimony oxide, calcium carbonate, kaolin, and combinations thereof. In one or more embodiments, the fillers comprise an inorganic and nonpolymeric material. In other embodiments, the fillers comprise silica and/or carbon black. In yet other embodiments, the fillers comprise silica. In various embodiments, the silica may comprise pretreated silica.

In various embodiments, the elastomeric composition can comprise at least about 5, 10, 15, 20, 25, 30, 35, 40, 45, or 50 phr of one or more fillers, based on the total weight of the elastomers. Additionally or alternatively, the elastomeric composition can comprise not more than about 250, 240, 230, 220, 210, 200, 190, 180, 170, 160, 150, 140, 130, 120, 110, 100, 90, 80, 70, or 60 phr of one or more fillers, based on the total weight of the elastomers. In certain embodiments, the elastomeric compositions can comprise 0 to 150 phr, 30 to 120 phr, or 50 toll 0 phr of one or more fillers.

In various embodiments, the elastomeric compositions can comprise one or more additives. In certain embodiments, the elastomeric composition can comprise at least about 1, 2, 5, 10, or 15 phr of one or more additives, based on the total weight of the elastomers. Additionally or alternatively, the elastomeric composition can comprise not more than about 70, 50, 40, 30, or 20 phr of one or more additives, based on the total weight of the elastomers. The additives can comprise, for example, processing aids, carrier elastomers, tackifiers, lubricants, oils, waxes, surfactants, stabilizers, UV absorbers/inhibitors, pigments, antioxidants, extenders, reactive coupling agents, and/or branchers.

In various embodiments, the elastomeric compositions can comprise at least one tackifier. It should be noted that this tackifier does not include the polyindane resin, which is considered a separate component in the present application. Tackifiers suitable for the compositions disclosed herein can be solids, semi-solids, or liquids at room temperature. Non-limiting examples of tackifiers include: (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; and (8) aromatic modified aliphatic or cycloaliphatic hydrocarbon resins and the hydrogenated derivatives thereof; and combinations thereof.

In certain embodiments, the elastomeric compositions can comprise less than 10, 5, 1, or 0.1 phr of a pentene compound (e.g., 1-pentene and/or 2-pentene), polyphenylene ethers, polysulfones, polycarbonates, polyaryl ether ketones, polyetherether ketones (PEEK), polyarylates, polyphenyl sulfide, polyimides, and/or polyamides. In other embodiments, the elastomeric compositions do not contain a pentene compound (e.g., 1-pentene and/or 2-pentene), polyphenylene ethers, polysulfones, polycarbonates, polyaryl ether ketones, polyetherether ketones (PEEK), polyarylates, polyphenyl sulfide, polyimides, and/or polyamides.

Due to the use of the polyindane resins, the elastomeric compositions of the present invention can exhibit a number of improvements associated with processability, strength, modulus, and elasticity.

The elastomeric compositions may be formed by blending the elastomer, polyindane resin, and the other components using conventional means known in the art. In various embodiments, the blending can occur at temperatures of at least about 80° C., 100° C., 120° C., 130° C., or 140° C. Additionally or alternatively, at least a portion of the blending can occur at temperatures of not more than about 220° C., 200° C., 190° C., 170° C., or 160° C.

The mixing and blending of the aforementioned components can be accomplished by any method known in the art that is sufficient to mix polyindane resins and elastomers. Examples of mixing equipment include, but are not limited to, intermeshing mixers, tangential mixers, Banbury mixers, Brabender mixers, roll mills, planetary mixers, single screw extruders, and twin screw extruders. The shear energy during the mixing is dependent on the combination of equipment, blade design, rotation speed (rpm), and mixing time.

The elastomeric compositions can be subjected to curing to thereby produce a cured elastomeric composition. The curing can be accomplished using any conventional method, such as curing under conditions of elevated temperature and pressure for a suitable period of time. For example, the curing process can involve subjecting the elastomeric composition to a temperature of at least 160° C. over a period of at least 15 minutes. Examples of curing systems that can be used include, but are not limited to, sulfur-based systems, resin-curing systems, soap/sulfur curing systems, urethane crosslinking agents, bisphenol curing agents, silane crosslinking, isocyanates, poly-functional amines, high-energy radiation, metal oxide crosslinking, and/or peroxide crosslinking.

The elastomeric compositions may be vulcanized using typical cure packages known to those skilled in the art. This includes, but is not limited to, accelerated sulfur vulcanization and peroxide vulcanization.

In certain embodiments, the elastomeric composition is formed into a tire and/or a tire component. The tires can include, for example, passenger tires, light truck tires, heavy duty truck tires, off-road tires, recreational vehicle tires, and farm tires. The tire component can comprise, for example, tire tread, subtread, undertread, body plies, belts, overlay cap plies, belt wedges, shoulder inserts, tire apex, tire sidewalls, bead fillers, and any other tire component that contains an elastomer. In one or more embodiments, the elastomeric composition is formed into tire tread, tire sidewalls, and/or bead fillers.

The pneumatic tire and tire components can be produced from the elastomeric composition of the present invention using any conventionally known method. In particular, the uncured elastomeric composition can be extruded and processed in conformity with the shape of the desired tire component and then effectively cured to form the tire component.

Preparation of the Polyindane Resins

Figure 4:
FIG. 4 depicts a process scheme for the manufacture of the indane resin monomer feedstock.

In various embodiments, the instant polyindanes are the product of the oligomerization of polyisopropenyl-substituted aromatic compounds. Production of a polyisopropenyl aromatic feedstock suitable for conversion to a polyindane resin can be done via the two-stage process outlined in FIG. 4, which generally comprises: (1) alkylation of an aromatic feedstock (A) and propylene (P) to one or more isopropyl-substituted aromatic compounds ($AI_n$), wherein n is an integer from 2-6; and (2) dehydrogenation or oxidation of $AI_n$ to an indane resin process monomer comprising or consisting essentially of one or more polyisopropenyl aromatic compounds ($AU_n$).

Generally, the most preferred starting compounds (A) include those that have favorable cost, availability, concentration of the most preferred components/isomers, ease of alkylation (highest yield, lowest process cost), ease of dehydrogenation (highest in yield of the preferred reactive monomer), and suitability for making a polyindane resin having the physical properties required for elastomer formulation.

For example, the aromatic feedstock (A) can be any commercially-available aromatic compounds derived from petroleum, such as benzene, toluene, ethylbenzene, and/or xylene. Depending on the ratio of reactants, alkylation of benzene, toluene, ethylbenzene, and xylene with propylene affords various mono-, di-, or triisopropyl-substituted aromatics. In each case, careful fractional distillation of the crude reaction product can produce the most preferred diisopropyl-substituted aromatic compound ($Al_n$) in good purity. In this manner, the addition of about two moles of propylene per mole of benzene, toluene, ethylbenzene, and/ or xylene yields, respectively, diisopropyl benzene, diisopropyltoluene, diisopropylethylbenzene and diisopropylxylene.

Figure 5:
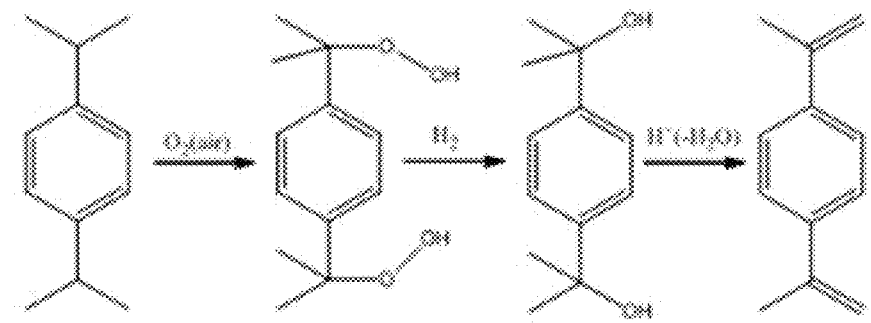
FIG. 5 depicts a schematic process for the oxidative conversion of para-di isopropylbenzene to para-diisopropenylbenzene.

Next, the intermediate aromatic compounds may be dehydrogenated to a mixture of the mono-isopropyl, mono-isopropenyl aromatic compound (AlU) and $Al_2$ over a cerium-promoted iron oxide catalyst. Conversion and selectivity of this process to the most preferred $AU_2$ compound varies depending on the starting aromatic compound and the positional isomer composition of the intermediate. Alternatively, the diisopropyl-substituted aromatic compounds $Al_2$ can be oxidized with air to the corresponding dihydroperoxides, reduced to the corresponding diols, and then dehydrated to the desired diisopropenyl-substituted aromatic compounds. FIG. 5 depicts the schematic process for the conversion of para-diisopropylbenzene to para-diisopropenylbenzene.

More specifically, the first step of the polyindane production process involves alkylation of an aromatic compound (A) with propylene to thereby yield one or more polyisopropyl-substituted aromatic compounds ($Al_n$). The aromatic compound (A) can be any aromatic hydrocarbon having at least two open (unsubstituted) ring positions, for example, benzene, naphthalene, or biphenyl. Preferably, the aromatic compound (A) comprises an aromatic hydrocarbon feedstock having a combination of low cost, good availability, highest yield and lowest process cost of propylation, and highest in yield of the preferred polymerizable monomer when subjected to dehydrogenation. Also important is that the monomer, when polymerized, yields a polymer having the properties required of its intended use. The most preferred aromatic compounds (A) comprise benzene, toluene, ethylbenzene, xylene, and/or naphthalene.

Depending on the ratio of reactants, propylation of benzene, toluene, ethylbenzene, xylene, and naphthalene can yield isomeric mono-, di-, tri-, or tetraisopropyl-substituted aromatic compounds (herein, the term "poly" refers to more than one of the designated substituent moieties). At very high aromatic/propylene ratios (A/P), the product can be a mono-isopropyl aromatic such as, for example, isopropylbenzene (cumene) from benzene, isopropyltoluene (cymene) from toluene, or dimethylisopropylbenzene (isomeric isopropylxylenes) from xylene.

At lower A/P ratios, di-alkylation is dominant. Addition of two moles of propylene per mole of, for example, benzene, toluene, and xylene affords, respectively, diisopropyl benzene, diisopropyltoluene, and diisopropylxylene. When propylene is present in excess, tri-propylation is possible and even higher levels of propylation are possible (e.g., tetra-propylation of naphthalene) and sometimes favored, especially at higher process temperatures and longer reaction times.

Technology for the alkylation of aromatics with olefins, such as propylene, is well-known in the chemical industry. For example, Friedel-Crafts alkylation of benzene with toluene using phosphoric acid or aluminum chloride catalysts has been used for many years in the production of cumene. The phosphoric acid may be liberated from a mixture of inorganic phosphates, optionally supported. Such processes may be used in the present invention. More recently, producers of cumene and other alkylated aromatics have increased the use of zeolite-based processes. Zeolite-based alkylation avoids corrosion and reduces environmental concerns associated with phosphoric acid and aluminum chloride. Also, zeolites can be regenerated.

Alkylation of aromatics with propylene can be performed in a batch or continuous process. Furthermore, alkylation may be performed either in the vapor phase or the liquid phase. Process equipment may include, but is not limited to, a multi-phase stirred tank reactor or a multi-phase fixed-bed reactor. Operating temperatures may range from 80 to 300° C. and pressures may range from 50 to 1000 psig.

The second step of the polyindane production process involves the dehydrogenation of the isopropylated aromatic compound $Al_n$ to thereby produce the polymerizable aromatic monomer $Al_{n-m}U_m$, where n is an integer from 2 to 6 and m is an integer from 2 to 6 such that m+1<n and is comprised of one or more polyisopropenyl-substituted aromatic compounds (where n−m is >1), but which may also contain the mono-substituted species $Al_{n-m}U$. For example, cumene and cymene can be readily dehydrogenated in high conversion and high selectivity to alpha-methylstyrene or methyl alpha-methylstyrene, respectively, over a commercial cerium-promoted iron oxide catalyst. The oligomerization process (details below) can transform these mono-olefin compounds by themselves to dimers, but will not yield resins. These mono-olefin materials can be useful in the regulation of the molecular weight of the polyindane resins.

Examples of the conversion of $Al_2$ to $AU_2$ can include the dehydrogenation of diisopropyltoluene (mixture of isomers) to diisopropenyl-toluene (mixture of isomers), diisopropylethylbenzene to diisopropenylethylbenzene, and diisopropylnaphthalene to diisopropenyl-naphthalene. A similar dehydrogenation process converts triisopropylbenzene to triisopropenylbenzene in high yield along with the corresponding diolefin and the corresponding mono-olefin. In various embodiments, this process may convert only one, two, or m of the n isopropyl substituents of $Al_n$, affording respectively, the mono-olefins, $Al_{n-1}U$ or the diolefins $Al_{n-2}U_2$, or the tri-olefins $Al_{n-3}U_3$. In general, complete dehydrogenation of all the isopropyl groups of $Al_n$ is not usually practiced as it requires extreme process conditions resulting in numerous byproducts; however, complete dehydrogenation is not required since some amount of mono-olefin can be beneficial to the polymerization process in order to limit the molecular weight of the resulting polyindane resin.

The third step of the polyindane production process involves treating a monomer feedstock comprising or consisting of a compound of the generalized structure $Al_{n-m}U_m$, whether pure or as a mixture of variously unsaturated aromatic compounds of general structure $Al_{n-m}U_m$ with an acid catalyst in order to obtain the polyindane polymer. Generally, the attempted polymerization of a polyfunctional olefin monomer when catalyzed by free-radical initiators, anionic catalysts, and Lewis acids such as dry, uncomplexed boron trifluoride or aluminum chloride, leads to highly cross-linked materials. If carried out in solution, the result is an intractable solvent-swollen gel. The expected result of the application of conventional Lewis acid-mediated polymerization of $AU_n$ monomers when n>1 is, at least, a very high molecular weight material or, more probably, a cross-linked gel. In many cases, the course of the anionic and free-radical polymerization of diisopropenyl aromatic monomers can lead to cross-linking.

The course of cationic polymerization of polyisopropenyl-substituted aromatic compounds can be very different, leading to low molecular weight substances with bicyclic (indane) structures as chain units. The designation "polyindane" is, then, given to this type of polymer. Treatment of polyisopropenyl-substituted aromatic compounds under specific conditions with a cationic substance, most usefully a Brønsted acid, can initiate a process that results in the formation of a polymer whose main chain can comprise largely of linked indane moieties. This process is believed to comprise an initial protonation of an isopropenyl group, addition to the resulting carbocation by a second isopropenyl group which is followed by intramolecular ring-closure.

Formation of the instant polyindanes takes place in a stepwise manner with concomitant cyclization only at sufficiently high reaction temperatures, typically at about 60° C. or higher. The process results in little or no formation of unsaturated linear (substituted 1-, or 2-pentene) structures and, therefore, affords no opportunity for chain branching and cross-linking. In the present invention, the main chain of the polyindane resin comprises or consists essentially of indane units, not counting the chain ends. The preparation of such resins by treatment of a polyisopropenylbenzene with a cationic catalyst was reported by H. Brunner, et al., J. Polymer Science-Polymer Letters, 1958, Volume 28, p. 629, and is also taught by Gloth, R. E., and Tazuma, J. J., in U.S. Pat. No. 4,205,160, the disclosures of which are incorporated herein by reference in their entireties.

If the reaction mixture comprises a mono-isopropenyl aromatic compound (e.g., alpha-methylstyrene) or an olefin (e.g., isobutylene, diisobutylene, d-limonene, styrene, and the like), the stepwise growth of the polyindane chain can be intercepted and likely terminated by the olefin moiety. Polyindanes of the present invention can, therefore, be controlled to any molecular weight by deliberate use of such olefin "terminators," with the molecular weight decreasing with increasing concentration in the reaction mixture of the olefin. Chain termination can also occur even in the absence of an olefin terminator, likely by chain scission, especially at higher reaction temperatures. The present invention is, therefore, not bound by the exact mode of termination. For example, a starting mixture consisting of a major portion of 1,3-diisopenylbenzene and a minor portion of alpha-methylstyrene, may yield a polyindane having the structure depicted in FIG. 3, which shows only one of many possible isomers.

Selection of the most favorable starting polyisopropenyl aromatic compounds, terminators, and reaction conditions affords, after removal by vacuum stripping of process solvent and any unreacted monomers, clear, hard, and amorphous polyindanes. In certain embodiments, the $AU_n$ monomer contains n=2 and comprises meta-diisopropenylbenzene, para-diisopropenylbenzene, or a mixture of these two positional isomers.

In various embodiments, at least 90% of the main chain of the polyindane resins may be formed from the indane repeat units. The percentage of cyclized repeat units forming the polyindane structure is a function of the polymerization parameters chosen.

Polyindane resins suitable for use in accordance with this invention may be fully aromatic or partially or substantially saturated. Any desired degree of saturation may be readily accomplished by catalytic hydrogenation by any well-known procedures, such as treating a solution of the polyindane resin in an inert solvent such as hexane, heptane, cyclohexane, mineral spirits, and the like with hydrogen under high pressure in the presence of a supported nickel, platinum, palladium, or ruthenium-containing catalyst.

In various embodiments, polyindane resins prepared by treating pure diisopropenyl aromatic compounds or isomeric mixtures thereof resulting from the dehydrogenation of di-propylated aromatic feedstocks, especially benzene, and optionally terminated by a significant portion of a mono-olefin such as styrene, isobutylene, diisobutylene, limonene, and alpha-methylstyrene, are useful as tackifiers for commonly used elastomers, such as various polyolefins and poly(styrene-co-olefin) block copolymers.

In various embodiments, the starting materials for the formation of polyindane polymers can include diolefins comprising 1,2-, 1,3-, and 1,4-diisopropenylbenzene; 2,3-, 2,4-, and 2,5-diisopropenyl-1-methybenzene; 2,3-, 2,4-, and 2,5-diisopropenyl-1-ethylbenzene; diisopropenyl-ortho-xylene; diisopropenyl-meta-xylene; and/or diisopropenyl-para-xylene. These diolefins may also be in admixture with an aromatic mono-olefin, $Al_mU$, and tri-olefin compounds, $AU_3$, which may be present as a result of the dehydrogenation process used to make the diolefin from the starting polyisopropylaromatic compound, $Al_n$. Other polymerizable compounds that may be present are des-methyl isomers, for example, 1-isopropenyl-2-(or 3-, or 4-vinyl) benzene or 2-isopropenyl-3-(or 4-, or 5-vinyl)-1-methylbenzene.

As discussed above, a large number of aromatic and non-aromatic mono-olefins can act as terminators during the production of polyindanes. In the absence of a deliberately-added chain terminator, various mechanisms for chain termination are likely, such as proton transfer and chain scission, but the preferred method of molecular weight control is by the addition to the monomer mixture of a mono-olefin such as styrene, vinyl toluene, alpha-methylstyrene, isobutylene, diisobutylene, 2-methyl-1-butene, 2-methyl-2-butene, dimers or oligomers thereof, combinations thereof, or, preferably, any of the possible $Al_nU$ species present in the product of the dehydrogenation process, for example, 1-isopropenyl-2(or -3, or -4-isopropyl)benzene or 1-isopropenyl-2 (or -3, or -4-isopropyl)-1-methylbenzene. When a chain terminator is added, the amount of the chain terminator can range from about 0.01 wt % to about 50 wt %, from about 0.01 wt % to about 40 wt %, from about 0.01 wt % to 30 wt %, from about 0.1 wt % to 20 wt %, from about 0.5 wt % to about 10 wt %, and from about 0.5 wt % to 5 wt % based on the total amount of monomer.

In various embodiments, the catalyst that affects the desired oligomerization and indane ring formation comprises any free, complexed, or supported Brønsted acid including concentrated aqueous phosphoric, sulfuric, nitric, or hydrochloric acids, a FILTROL (or similar) acid-activated clay, perfluoroalkanoic acids such as trifluoroacetic acid, and sulfonic acids such as para-toluenesulfonic acid, methanesulfonic acid, AMBERLYST (or similar) sulfonic acid supported on crosslinked polystyrene beads, and/or NAFION supported fluorinated sulfonic acid.

Lewis acids are also polyisopropenyl aromatic compound polymerization catalysts. Examples of Lewis acids include, but are not limited to, Friedel-Crafts metal halides (e.g., boron trifluoride, stannic chloride, aluminum chloride, aluminum bromide, titanium tetrachloride, zinc chloride, ferric chloride, vanadium chloride, and phosphorus pentafluoride); and organometallic catalysts including diethyl aluminum chloride, ethyl aluminum dichloride, and their complexes. Boron trifluoride may be in the anhydrous gaseous form or a solid or liquid form such as boron trifluoride complexed with a wide variety of organic compounds. Effective examples of complexing organic compounds are the lower fatty acids such as acetic and propionic acid, dialkyl ethers, such as methyl ethyl ether, ethyl ether, and propyl ethers, phenols and lower alkyl alcohols and esters. Preferred catalysts include boron trifluoride-acetic acid and boron trifluoride-ethyl ether.

The acid-activated clay catalyst may include naturally occurring clay mineral such as kaolinite, bentonite, attapulgite, montmorillonite, clarite, Fuller's earth, hectorite, or beidellite. The montmorillonite can be treated with a member selected from the group consisting of sulfuric acid and hydrochloric acid. The acid activated clay may include synthetic clay. The synthetic clay may include one member selected from the group consisting of saponite and hydrotalcite. The acid activated clay may include modified clay such as pillared clay. The pillared clay may include one member selected from the group consisting of aluminum oxide pillared clay, cerium modified alumina pillared clay, and metal oxide pillared clay. The acid activated clay may include Brønsted acid on clay, wherein the Brønsted acid includes a member selected from the group consisting of hydrofluoric acid, sulfuric acid, nitric acid, phosphoric acid, and hydrochloric acid. One example of a commercially available solid acid clay catalyst suitable for use in embodiments of the present invention is FILTROL F-22 (and similar) acid clay catalyst, available from BASF Corporation (Iselin, N.J.). The Brønsted acid may be impregnated onto silica, silica-alumina, amorphous silica-alumina, a zeolite, or a mesoporous form of silica, alumina, or silica-alumina. Various methods for drying the sulfonic acid-bound resin or acid-activated clay catalyst are useful to remove bound and/or freely-associated water, thereby maximizing catalyst acidity and activity, for example, vacuum oven drying or azeotropic distillation.

The polymerization reaction can be carried out in a continuous, batch, or semi-batch mode and the reactor can comprise any suitable type of reactor, including, for example, a fixed bed reactor, a fluidized bed reactor, a continuous stirred tank reactor (CSTR), a plug-flow reactor, a continuous loop tubular reactor, and combinations thereof. The reactors can be equipped with internal and/or external cooling to maintain the polymerization temperature. The reaction may be carried out with a pressure sufficient to prevent substantial loss by evaporation of the reactants and/or diluent typically being used. Sub-atmospheric, atmospheric and super-atmospheric pressures may be employed.

The polyisopropenyl aromatic compound-containing feedstock, and optional mono-olefin terminator compound ("monomer" or "monomers"), the processing solvent (i.e., the diluent), and the catalyst can be introduced into the reactor in any suitable order. In one embodiment, the polyisopropenyl aromatic compound-containing feedstock and the mono-olefin terminator compound are added to the reactor at the same time in separate streams or as a mixture. In a further embodiment, the catalyst and solvent are added to the reactor as a mixture. The reaction mixture may be polymerized in the presence of an inert hydrocarbon material as a diluent or solvent. Typically, the inert solvent is a non-olefinic aliphatic or aromatic hydrocarbon composition, which is in the liquid state under the conditions of polymerization. As used herein, the terms "inert solvent" and "inert polymerization solvent" refer to a solvent that does not significantly participate in the polymerization reaction. Although not wishing to be bound by theory, it is hypothesized that, unlike many reactive solvents, the molecular structures of inert solvents may not alkylate the growing polymer chain. Inert solvents can comprise one or more aliphatic hydrocarbon compounds, including, for example, straight-chain aliphatic hydrocarbons such as hexanes, heptanes, octanes, and isomers thereof; cycloaliphatic hydrocarbons including cyclohexanes such tetramethylcyclohexane and trimethylcyclohexane, and isomers thereof; halogen-substituted hydrocarbon compounds, such as methylene chloride; and non-aromatic distillate blends. An inert solvent may also include a small amount of one or reactive aromatic hydrocarbon compounds, while still maintaining its non-reactive functionality. Examples of suitable inert solvents, can include, but are not limited to, mineral spirits such as white spirits, Stoddard solvent, odorless mineral spirits, Rule 66 mineral spirits, and combinations thereof. The process solvent can include, if it is suitable, reclaimed or recycled solvent.

still maintaining its non-reactive functionality. Examples of suitable inert solvents, can include, but are not limited to, mineral spirits such as white spirits, Stoddard solvent, odorless mineral spirits, Rule 66 mineral spirits, and combinations thereof. The process solvent can include, if it is suitable, reclaimed or recycled solvent.

The processing solvent may be an aromatic solvent whose constituents contain cyclic carbon-to-carbon double bonds or aliphatic solvents whose constituents contain no cyclic carbon-to-carbon double bonds. Examples of suitable polymerization solvents can include, but are not limited to, benzene, alkyl-substituted benzenes such as xylene and toluene, ethyl benzene, ethyl toluene, indene, cumene, or trimethylbenzene. The diluent may also be selected from solvents such as petroleum naphtha, hexane, and light aromatic petroleum distillates such as "Aromatic A-100" (commercially available from ExxonMobil Chemical Co.), "HiSol 10" (commercially available from Ashland Chemical Inc.), and "Cyclosol 53" (commercially available from Shell Chemical Co.). Minor portions of these solvents may be incidentally incorporated into the hydrocarbon resin such as by alkylation.

The monomer feed and/or the catalyst-containing feed can be combined with one or more process solvents prior to, or shortly after, being introduced into the reactor. The monomer and catalyst-containing feed can be introduced into the process reactor at substantially the same time. The catalyst or pre-mixed catalyst/solvent slurry can be introduced into reactor, after the reactor has been initially charged with monomer. This addition of catalyst or catalyst/solvent slurry to the monomer is referred to as "straight addition." Alternatively, the monomer feed can be added incrementally or continuously, to pre-mixed catalyst/solvent slurry or a fixed bed of pelletized catalyst initially charged or loaded into to polymerization reactor. The addition of the monomer to the catalyst or catalyst/solvent slurry can also be referred to as "reverse addition."

In various embodiments, the process temperatures are in the range 0 to 150° C. Generally, the most convenient and useful process temperatures are about 40 to 120° C., more preferably from 60 to 100° C. The preferred reaction temperature depends on the catalyst used and, because it has an effect on polymer structure, must be chosen to optimize the formation of the desired indane structure.

The polyindane-forming reaction is carried out for a sufficient amount of time in order to achieve a desired polymer yield, molecular weight, and softening point. Any suitable system for controlling the reaction temperature within reactor can be used, including, for example, an external heat exchanger loop, one or more internal cooling coils, and/or a reactor-cooling jacket.

Once complete, the polyindane-forming reaction can be stopped by physically separating the liquid reaction medium from the solid catalyst or the catalyst may be neutralized with a suitable reagent. The latter is accomplished by treating the reaction product solution with clay, e.g., attapulgus clay, or fuller's earth, or a combination of hydrated lime and clay, to neutralize the catalyst, with the catalyst/ clay sludge thereafter being removed by filtration. Caustic or soda ash (sodium carbonate) solutions may also be used to neutralize the catalyst.

The resin product can then be recovered from the reaction mixture by conventional methods such as distillation, flash evaporation under vacuum or at atmospheric pressure, or liquid phase precipitation in a suitable non-solvent such as methanol or isopropanol or combinations thereof. The solvent and polymerizate oils (e.g., dimers, trimers, and oligomers, as well as other reaction byproducts) can be separated from the polymer product.

The resin product can also be further processed to remove additional oligomers and polymerizate oils. "Oligomers" are defined as dimer, trimers, tetramers, and pentamers. Processes for removing oligomers and polymerizate oils can be any that is known in the art. For example, membrane separation, selective precipitation, selective polymerization conditions, evaporation, distillation, and gel permeation chromatography can be utilized.

Furthermore, in various embodiments, the polyindane resins of this invention may be modified by hydrogenating aromatic unsaturation to different degrees. Examples of modifications to enhance the resins' usefulness in their intended end-use applications include, but are not limited to, improving the color, the oxidative and thermal stabilities, and the compatibility with polymers and other formulation components.

The liquid-phase catalytic hydrogenation reaction is generally carried out in the presence of hydrogen and a suitable base metal or noble metal catalyst. Examples of useful catalysts include, but are not limited to, nickel, palladium, other precious metals such as platinum or ruthenium, and mixed metal catalysts such as copper-chromite and copper-zinc, frequently employed on a support including, but not limited to, carbon, silica, or alumina. Diluents (solvents) may be added to improve handling, heat transfer, and processability by lowering the resins' viscosity. Examples of suitable solvents include, but are not limited to, Stoddard solvents, mineral spirits, hexane, and heptane. Aromatic solvents may be used, but more typically, aliphatic solvents are used to minimize hydrogen consumption and heat evolution. The process is operated at the lowest effective temperature and highest pressure to achieve the desired conversions. Typically, temperatures ranging from 150 to 260° C. and pressures of 300 to 3,000 psig are employed. The process may be operated either isothermally or adiabatically. Processing conditions are controlled to maintain the highest catalyst activity and to minimize the deactivation mechanisms of catalyst sintering, coking, and poisoning. Processing conditions include inlet and outlet temperature, reactor pressure, hydrogen flowrate, adiabatic temperature rise, and hydrogen consumption concentration.

Many types of reactors can be used. Examples of suitable batch-slurry reactors include, but are not limited to, a standard batch reactor and an advanced batch reactor manufactured by the Biazzi Corporation in Switzerland. Examples of continuous reactors include a stirred tank reactor with a catalyst slurry, an advanced loop reactor with a catalyst slurry (such as those manufactured by Buss Chemtech, Switzerland), an isothermal trickle-bed reactor with a packed bed pelletized catalyst, and an adiabatic trickle-bed reactor with a pelletized catalyst.

The general procedure for batch hydrogenation is to charge the polyindane resin, solvent (if needed), and catalyst to the reactor. After flushing the reactor with nitrogen to ensure an inert atmosphere, the hydrogen is fed into the reactor until the final desired pressure is achieved. During this time, the hydrogen flow is controlled to maintain the pressure. The reactor temperature is controlled by selective heating/cooling as needed. When the desired degree of hydrogenation is achieved, the reactor contents are cooled, the reactor is vented and flushed with nitrogen to prepare it for the next batch. The catalyst is removed by filtration and the resin products are isolated by distilling off the solvent and oligomer oils.

The general procedure for continuous hydrogenation is to dissolve the resin in a suitable aliphatic solvent and feed the resin solution at a controlled rate to maintain the reactor temperature into the reactor containing a fixed bed of pelletized catalyst. The hydrogen flow rate, inlet and outlet temperatures, and reactor pressure are controlled to achieve the desired degree of hydrogenation. During the reaction, a portion of the reactor effluent may be recycled back to the reactor to maintain temperatures and achieve the desired degree of hydrogenation. The reactor effluent is subsequently sent through one or more vessels to cool the solution and reduce the pressure to atmospheric. The resin product is then isolated by distilling off the solvent and oligomer oils.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

This invention can be further illustrated by the following examples of embodiments thereof, although it will be understood that these examples are included merely for the purposes of illustration and are not intended to limit the scope of the invention unless otherwise specifically indicated.

EXAMPLES

Examples 1-5: Alkylation of Toluene with Propylene

Example 1

Zeolite-Y (4.4 grams, CBV 780, Zeolyst) and toluene (220 grams) were charged into a 300 milliliter autoclave. The autoclave was leak tested with 500 psig nitrogen then the pressure was reduced to about 5 psig and propylene (251.2 grams) was added. The autoclave was heated to 150° C. and agitated with a mechanical stirrer at 800 rpm. After 5 hours at 150° C., the autoclave was cooled to ambient temperature and the product discharged. Toluene conversion was estimated as 43% based on gas chromatography (GC) peak area % analysis. The relative distribution of monoisopropyltoluene, diisopropyltoluene, and triisopropyltoluene products was 72%, 25%, and 3%, respectively.

Example 2

4.0 grams of Zeolite-Y (CBV 780, Zeolyst) and 200 grams of toluene were charged into a 300 milliliter autoclave. The autoclave was pressurized with 500 psig nitrogen for a leak test. The pressure was then reduced to about 5 psig and 274 grams of propylene were added to the autoclave.

The autoclave was heated to 170° C. and agitated with a mechanical stirrer at 800 rpm. After 5 hours at 170° C., the autoclave was cooled to ambient temperature. The product was discharged from the autoclave and analyzed. Based on GC peak area percentage, toluene conversion was 48%. The distribution of monoisopropyltoluene, diisopropyltoluene, and triisopropyltoluene was 64%, 31%, and 5%, respectively.

Example 3

0.5 grams of Zeolite-beta (CP 814E, Zeolyst, calcined in air at 400° C. for 4 hours prior to use) and 50 grams of toluene were charged into a 100 milliliter autoclave. The autoclave was pressurized with 300 psig nitrogen for a leak test. The pressure was then reduced to about 2 psig. Propylene was introduced into the autoclave from a cylinder via stainless steel tubing. The propylene cylinder pressure was maintained at 100 psig during reaction. The valve between the autoclave and the propylene cylinder was kept open. The autoclave was then heated to 150° C. and agitated with a mechanical stirrer at 800 rpm. After 4 hours at 150° C., the propylene line was closed and the autoclave was cooled to ambient temperature. The product was discharged from the autoclave and analyzed. Based on the GC peak area % data toluene conversion was 27%. The distribution of monoisopropyltoluene, diisopropyl-toluene, and triisopropyltoluene was 92%, 8%, and 0%, respectively.

Example 4

0.5 grams of Zeolite-Y (CBV 400, Zeolyst) and 50 grams of toluene were charged into a 100 milliliter autoclave. The autoclave was pressurized with 300 psig nitrogen for a leak test. The pressure was then reduced to about 2 psig. Propylene was introduced into the autoclave from a cylinder via stainless steel tubing. The propylene cylinder pressure was maintained at 100 psig during reaction. The valve between the autoclave and the propylene cylinder was kept open. The autoclave was then heated to 150° C. and agitated with a mechanical stirrer at 800 rpm. After 4 hours at 150° C., the propylene line was closed and the autoclave was cooled to ambient temperature. The product was discharged from the autoclave and analyzed. Based on GC peak area %, data toluene conversion was 74%. The distribution of mono-isopropyltoluene, diisopropyltoluene, and triisopropyltoluene was 44%, 42%, and 15%, respectively.

Example 5

0.5 grams of Zeolite-Y (CBV 780, Zeolyst) and 50 grams of toluene were charged into a 100 milliliter autoclave. The autoclave was pressurized with 300 psig nitrogen for a leak test. The pressure was then reduced to about 2 psig. Propylene was introduced into the autoclave from a cylinder via stainless steel tubing. The propylene cylinder pressure was maintained at 100 psig during reaction. The valve between the autoclave and the propylene cylinder was kept open. The autoclave was then heated to 150° C. and agitated with a mechanical stirrer at 800 rpm. After 4 hours at 150° C., the propylene line was closed and the autoclave was cooled to ambient temperature. The product was discharged from the autoclave and analyzed. Based on GC peak area % data, toluene conversion was 78%. The distribution of mono-isopropyltoluene, diisopropyltoluene, and triisopropyltoluene was 60%, 28%, and 12%, respectively.

Example 6—Dehydrogenation

Dehydrogenation of isopropyl-substituted aromatic compounds, such as cumene, cymene, diisopropyltoluene, and triisopropylbenzene, to the corresponding olefin or mixture of olefins was carried out in a reactor system consisting of low-flow liquid feed pumps, a preheater section operating at about 270° C. to vaporize each of the two feed streams (water and hydrocarbon), a super-heater for the combined vaporized feeds to raise the vapor temperature to close to the desired reaction temperature (about 500-620° C.), an electrically-heated furnace with a cylindrical inner cavity capable of holding a 3-foot-long column, a vertically-mounted cylindrical fixed-bed reactor (diameter of 1.5", height of 28") made of Alloy 800H steel and packed with process catalyst and indented with wells for thermocouples, and a product vapor condenser section consisting of an angled, jacketed steel pipe chilled by cold water. The reactor was configured such that reactants flowed to the catalyst bed at the top and products exited the catalyst bed at the bottom. The reactor system was connected to a steam-jet vacuum line to allow for a reduced pressure operation and to a nitrogen line to allow purging with inert gas.

The size or volume (V) of the catalyst bed to accommodate the flow (F) at the desired conversion depended critically on the required liquid hourly space velocity (LHSV=F/V). The LHSV was about 0.2-0.3 $h^{-1}$.

The catalyst was a commercial potassium and cerium ion-doped iron oxide in the form of an extrudate pellet having a 3 mm diameter and a length of 1-2 cm. When packed, this material occupied about 54% of the available volume, leaving a void of about 46% of the available space through which the reaction vapors could move with little pressure drop. The catalyst bed was kept blanketed with nitrogen and steam when not in use at elevated temperatures.

Dehydrogenation of an isopropyl-substituted aromatic compound was performed by pumping feed hydrocarbon and steam into the pre-heater section, combining the vapors in the super-heater section, passing these into the reactor section through the catalyst bed, condensing the product vapors in the condenser section, and allowing the hydrogen gas so liberated to pass out of the system through a vent line. The best operating conditions fell into the following ranges: an operating temperature of 550-620° C.; a system pressure of 1.0-0.33 atm; a feed flow rate of 1.0-2.0 ml/min; and a water flow rate of 1.0-4.0 ml/min.

1,3,5-triisopropylbenzene was provided to the reactor at a flow rate of 1.0 ml/min, with water also at 1.0 ml/min, and the super-heated combined vapors were passed over the reactor bed held at a middle-of-the-bed temperature of 580° C. and a system pressure of 0.33 atm. Product exiting the reactor contained the following components (by gas chromatography): triisopropylbenzene, 21.5%; diisopropyl-mono-isopropenylbenzene, 20.2%; isopropyl-di-isopropenylbenzene, 17.1%; and triisopropenylbenzene, 8.4%. This result represents a conversion of about 78.5% with selectivity to isopropenyl aromatic compounds of at least 58.2%. In addition, the product contained components totaling about 9-10% that were not positively identified, but believed to be olefins having a vinyl group in place of an isopropenyl group. Taking these compounds into account, the selectivity for all potentially polymerizable compounds was about 87%.

Examples 7-27—Oligomerization

Oligomerization of a diolefin monomer comprising high-purity meta-diisopropylbenzene (DIPB) blended with a lesser amount of the mono-olefin terminator dissolved in a roughly equal weight of solvent proceeded by the gradual addition of these reactants to a mixture (solution or suspension) of catalyst and solvent in a stirred reactor under a nitrogen gas blanket. The rate of addition was as rapid as heat-removal allowed such that the desired reaction temperature remained constant. The properties of the polymers produced with this process is described in Examples 7-27 below and in TABLES 1 and 2.

Example 7

The reactor charge was 75 mL of heptane and 15 grams of oven-dried AMBERLYST®15 sulfonic acid beads. The monomer mixture added to that charge comprised 40 grams of meta-diisopropenylbenzene, 40 grams of diisobutylene (mixed isomers, about 75% as 2,4,4-trimethyl-1-pentene), and 75 mL of heptane. The addition time was 3 hour and the reaction temperature was 80° C. Filtration to remove the catalyst and solvent stripping under reduced pressure of about 1 torr with heating to a temperature of about 180° C. afforded a clear and nearly colorless resinous brittle solid product having a softening point (Ring & Ball method) of 79° C. and a weight-average molecular weight (Mw) of 900 daltons.

Example 8

The reactor charge was 50 mL of cyclohexane and 10 grams of oven-dried AMBERLYST™15 sulfonic acid beads. The monomer mixture comprised 35 grams of DIPB, 15 grams of styrene, and 50 mL of cyclohexane. The addition time was 2 hours and the reaction temperature 80° C. Product work-up consisted of filtration to remove the catalyst and stripping under reduced pressure of about 1 torr with heating to a temperature of about 180° C. to remove solvent. The product was a clear and nearly colorless brittle solid product having a softening point (Ring & Ball method) of 111° C. and an Mw of 1150 daltons.

Examples 9-21

The procedures of Examples 9-21 were similar to those of Examples 7 and 8 and used (as the mono-olefin terminator) diisobutylene, styrene, vinyl toluene, indene, or alpha-methyl styrene (AMS) as depicted in TABLE 1 in the amounts listed. The properties of the resins in these examples show the versatility of the process. Examples 14-21 illustrate the ability to tailor the properties of these novel hydrocarbon resins by varying feedstock ratios and polymerization conditions to make different resins using a single terminator, namely, AMS.

TABLE 1

Experimental Details for AMBERLYST ® 15-Mediated Co-reactions of meta-Diisopropenyl-benzene and Various Mono-Olefin Terminators

| Ex. # | Terminator | React Temp. (° C.) | Terminator Wt. Fraction | $M_n$ | $M_w$ | $M_z$ | MWD | RBSP (° C.) |
|---|---|---|---|---|---|---|---|---|
| 7 | Diisobutylene | 80 | 0.50 | 660 | 900 | 1400 | 1.36 | 79 |
| 8 | Styrene | 80 | 0.30 | 655 | 1150 | 2099 | 1.76 | 111 |
| 9 | Diisobutylene | 80 | 0.25 | 930 | 1382 | 2482 | 1.49 | 140 |
| 10 | Diisobutylene | 80 | 0.38 | 800 | 1120 | 1840 | 1.40 | 140 |
| 11 | Styrene | 75 | 0.34 | 720 | 1337 | 2853 | 1.86 | 112 |
| 12 | Vinyltoluene | 80 | 0.30 | 778 | 1360 | 2510 | 1.75 | 121 |
| 13 | Indene | 80 | 0.30 | 475 | 786 | 1680 | 1.65 | 81 |
| 14 | AMS | 80 | 0.50 | 503 | 620 | 770 | 1.24 | 94 |
| 15 | AMS | 80 | 0.45 | 570 | 757 | 1045 | 1.32 | 99 |
| 16 | AMS | 80 | 0.43 | 530 | 790 | 1196 | 1.49 | 92 |
| 17 | AMS | 80 | 0.30 | 640 | 935 | 1415 | 1.46 | 113 |
| 18 | AMS | 80 | 0.28 | 714 | 1110 | 1820 | 1.56 | 126 |
| 19 | AMS | 80 | 0.15 | 990 | 1990 | 4070 | 2.01 | 169 |
| 20 | AMS | 105 | 0.10 | 785 | 1200 | 1890 | 1.52 | 141 |
| 21 | AMS | 55 | 0.10 | 1150 | 3280 | 9040 | 2.85 | 179 |

Examples 22-27

The procedures of Examples 22-27 were similar to those of Examples 7 and 8, but used FILTROL 22 acid clay as catalyst. TABLE 2 lists the molecular characteristics of the representative polyindane resins terminated with three different mono-olefins, namely, alpha-methyl styrene (AMS), styrene, and 4-methyl-alpha-methylstyrene (Cymenene).

TABLE 2

Properties of Polyindane Resins Prepared From meta-Diisopropylbenzene Using an Acid Clay as Oligomerization Catalyst

| | Sample | | | | | |
|---|---|---|---|---|---|---|
| | 22 | 23 | 24 | 25 | 26 | 27 |
| DIPB (g) | 200 | 185 | 155 | 140 | 140 | 140 |
| AMS (g) | 50 | 65 | 95 | 110 | — | — |
| Cymenene (g) | — | — | — | — | — | 110 |
| Styrene (g) | — | — | — | — | 110 | — |
| MMAP | 22.5 | 18.5 | 16.6 | 11.9 | 4.7 | 25.6 |
| RBSP (° C.) | 126.9 | 108.7 | 104.0 | 95.0 | 100.0 | 106.9 |
| $M_n$ | 822 | 663 | 628 | 575 | 646 | 646 |
| $M_w$ | 1255 | 951 | 857 | 783 | 982 | 888 |
| $M_z$ | 1877 | 1385 | 1195 | 1099 | 1527 | 1249 |
| MWD ($M_w/M_n$) | 1.53 | 1.44 | 1.37 | 1.36 | 1.52 | 1.37 |
| $T_g$ (DSC, ° C.) | 90.5 | 71.8 | 67.5 | 56.8 | 56.5 | 70.0 |

Examples 28 and 29—Hydrogenation

Example 28

A solution of 90 grams of the resin in Example 11 from TABLE 1 was mixed with 90 milliliters of EXXSOL™ dearomatized hydrocarbon fluid (ExxonMobil Corp.) in an autoclave and 18 grams of Ni 5256 nickel catalyst (BASF Corporation) was charged to the mixture. The mixture was heated to 220° C. and the autoclave was pressurized to 2000 psig hydrogen. The product, after stripping under vacuum to 180° C., had a ring and ball softening point of 111° C., a molecular weight profile of Mn 644, Mw 1067, and Mz 1937, and a proton area % aromaticity by NMR of <5%.

Example 29

The resin of Example 16 was hydrogenated according to the procedure of Example 28. The product, after stripping under vacuum, had a ring and ball softening point of 99° C., a molecular weight profile of Mn 425, Mw 610, and Mz 840, and an NMR proton area % aromaticity of <2%.

Example 30—Elastomeric Compositions

Several representative examples of the polyindane resin ("PI") were prepared and tested in silica tread compounds and compared to typical high performance resins types including Impera™ P1503, Impera™ P1504, Impera™ E1501, Impera™ E1602, and Impera™ E1601 produced by Eastman Chemical for tire tread applications. Three different terminators for the polyindane polymerization were used, including alpha-methyl styrene, styrene, and p-cymenene. The polyindanes from Examples 22-27 (i.e., Samples 22-27) were utilized for this study.

The formulation for the silica tread compound is shown in TABLE 3 and the mixing procedure used to produce the formulations is outlined in TABLE 4.

TABLE 3

| First Stage | Density (g/cc) | 101 | 102 | 103 | 104 | 105 | 106 | 107 | 108 | 109 | 110 | 111 | 112 | 113 |
|---|---|---|---|---|---|---|---|---|---|---|---|---|---|---|
| Duradene™ 738 (sSBR) | 0.95 | 70 | 70 | 70 | 70 | 70 | 70 | 70 | 70 | 70 | 70 | 70 | 70 | 70 |
| 140 ND (BR) | 0.91 | 30 | 30 | 30 | 30 | 30 | 30 | 30 | 30 | 30 | 30 | 30 | 30 | 30 |
| Ultrasil™ 7000GR (Silica) | 2 | 80 | 80 | 80 | 80 | 80 | 80 | 80 | 80 | 80 | 80 | 80 | 80 | 80 |
| N234 Carbon Black | 1.85 | 10 | 10 | 10 | 10 | 10 | 10 | 10 | 10 | 10 | 10 | 10 | 10 | 10 |
| Si69 Silane Coupling Agent | 1.1 | 6.4 | 6.4 | 6.4 | 6.4 | 6.4 | 6.4 | 6.4 | 6.4 | 6.4 | 6.4 | 6.4 | 6.4 | 6.4 |
| Tudalen™ 4192 (TDAE oil) | 0.94 | 10 | 10 | 10 | 10 | 10 | 10 | 10 | 10 | 10 | 10 | 10 | 10 | 10 |
| Impera™ P1504 | 1 | 20 | | | | | 20 | | | | | | | 20 |
| Impera™ E1602 | 1 | | 20 | | | | | | | | | | | |
| Impera™ E1501 | 1 | | | 20 | | | | | | | | | | |
| Impera™ E1601 | 1 | | | | 20 | | | | | | | | | |
| Impera™ P1503 | 1 | | | | | 20 | | | | | | | | |
| Sample 22 | 1 | | | | | | | 20 | | | | | | |
| Sample 23 | 1 | | | | | | | | 20 | | | | | |
| Sample 24 | 1 | | | | | | | | | 20 | | | | |
| Sample 25 | 1 | | | | | | | | | | 20 | | | |
| Sample 26 | 1 | | | | | | | | | | | 20 | | |
| Sample 27 | 1 | | | | | | | | | | | | 20 | |
| Zinc Oxide | 5.57 | 3 | 3 | 3 | 3 | 3 | 3 | 3 | 3 | 3 | 3 | 3 | 3 | 3 |
| Stearic Acid | 0.85 | 1 | 1 | 1 | 1 | 1 | 1 | 1 | 1 | 1 | 1 | 1 | 1 | 1 |
| Santoflex™ 6PPD (antioxidant) | 0.99 | 2 | 2 | 2 | 2 | 2 | 2 | 2 | 2 | 2 | 2 | 2 | 2 | 2 |
| Nochek™ 4729A (wax) | 0.91 | 1 | 1 | 1 | 1 | 1 | 1 | 1 | 1 | 1 | 1 | 1 | 1 | 1 |
| Total phr | | 233.40 | 233.40 | 233.40 | 233.40 | 233.40 | 253.40 | 233.40 | 233.40 | 233.40 | 233.40 | 233.40 | 233.40 | 233.40 |
| Second Stage | | 201 | 202 | 203 | 204 | 205 | 206 | 207 | 208 | 209 | 210 | 211 | 212 | 213 |
| First stage stock | | 233.40 | 233.40 | 233.40 | 233.40 | 233.40 | 253.40 | 233.40 | 233.40 | 233.40 | 233.40 | 233.40 | 233.40 | 233.40 |
| Total phr | | 233.40 | 233.40 | 233.40 | 233.40 | 233.40 | 253.40 | 233.40 | 233.40 | 233.40 | 233.40 | 233.40 | 233.40 | 233.40 |
| Third Stage | Density (g/cc) | 301 | 302 | 303 | 304 | 305 | 306 | 307 | 308 | 309 | 310 | 311 | 312 | 313 |

TABLE 3-continued

Tread Formulations

| | | | | | | | | | | | | | | |
|---|---|---|---|---|---|---|---|---|---|---|---|---|---|---|
| Second stage stock | | 233.40 | 233.40 | 233.40 | 233.40 | 233.40 | 253.40 | 233.40 | 233.40 | 233.40 | 233.40 | 233.40 | 233.40 | 233.40 |
| n-cyclohexyl-2-benzothiazole sulfonamide | 1.28 | 1.5 | 1.5 | 1.5 | 1.5 | 1.5 | 1.5 | 1.5 | 1.5 | 1.5 | 1.5 | 1.5 | 1.5 | 1.5 |
| Diphenyl Guanidine | 1.18 | 2 | 2 | 2 | 2 | 2 | 2 | 2 | 2 | 2 | 2 | 2 | 2 | 2 |
| Sulfur | 2.08 | 1.5 | 1.5 | 1.5 | 1.5 | 1.5 | 1.5 | 1.5 | 1.5 | 1.5 | 1.5 | 1.5 | 1.5 | 1.5 |
| Total phr | | 238.40 | 238.40 | 238.40 | 238.40 | 238.40 | 258.40 | 238.40 | 238.40 | 238.40 | 238.40 | 238.40 | 238.40 | 238.40 |

TABLE 4

| | Time (min) |
|---|---|
| First Stage | |
| Starting RPM: 65 | |
| Starting temperature: 80° C./176 F. | |
| Ram pressure: 60 psi | |
| a) Add polymers (SBR and BR); start clock when all is in mixer | 0 |
| b) Add ⅔ of the silica, silane, zinc oxide, stearic acid, and resin (if present) | 0.5 |
| c) Clean and add all remaining ingredients (⅓ silica, carbon black, oil, 6PPD, IPPD, TMQ, wax) | 1.5 |
| d) Adjust the rpm to reach batch temperature of 160° C./320° F. by 4 minutes | 2.5-4.0 |
| e) Clean and keep ram raised for 0.5 min. | 4.0 |
| f) Lower ram | 4.5 |
| g) Adjust the rpm to maintain batch temperature of 160° C./320° F. | 4.5-6.5 |
| h) Discharge batch (batch temperature 155-165° C./311-329° F.) | 6.5 |
| i) Two-roll milling for 2 minutes (60° C./140° F., 16 to 20 rpm, 2 mm nip gap) | — |
| Record Banbury rpm, temperature, and energy input vs. time | |
| Record dump temperature | |
| Second Stage | |
| Starting RPM: 80 | |
| Starting temperature: 80° C./176 F. | |
| Ram pressure: 60 psi | |
| a) Add batch from first stage; start clock when all is in mixer | 0 |
| b) Reach and maintain batch temperature of 160° C. by adjusting the rpm | 2.0-6.0 |
| c) Discharge batch (batch temperature 155-165° C.) | 6.0 |
| d) Two-roll milling for 2 minutes (60° C., 16 to 20 rpm, 2 mm nip gap) | — |
| Record Banbury rpm, temperature, and energy input vs. time | |
| Record dump temperature | |
| Third Stage | |
| Starting RPM: 40 | |
| Starting temperature: 50° C./122 F. | |
| Ram pressure: 60 psi | |
| a) Add batch from second stage; start clock when all is in mixer | 0 |
| b) Add all other ingredients (DPG, CBTS, and sulfur) | 0.5 |
| c) Discharge batch (batch temperature 90-110° C.) | 2.0 |
| d) Two-roll milling for 2 minutes (60° C., 16 to 20 rpm, 2 mm nip gap) | — |
| Record Banbury rpm, temperature, and energy input vs. time | |
| Record dump temperature | |

After mixing, the formed elastomeric compositions were tested for cure, tensile, hardness, viscosity, and dynamic mechanical properties. For the testing, the following procedures were followed: RPA strain sweep, ASTM D6601; MDR for cure properties measured after 40 minutes at 160° C., ASTM D5289; Shore A hardness, ASTM D2240; Tensile testing, ASTM D412 and D624; Die Cat 100° C. and room temperature, ASTM D624; Pico abrasion after 80 revolutions, ASTM D5963; and Dynamic mechanical analysis using strain sweeps to determine tan delta values. The strain sweeps were conducted at 0° C., 30° C., and 60° C., at 10 Hz, from 0.038 to 40% strain. The results of these tests are depicted in TABLE 5. In regard to the measured MDR values, "t90" refers to the time corresponding to that perfect of curing (e.g., t90 is the time to get to 90% of the total cure). In regard to the measured Mooney Scorch ("MS") values, "tMm" refers to the time to reach minimum Mooney Viscosity ("MV"), while "t2," "t5," and "t35" refer to the time to reach 2, 5, and 35 Mooney units, respectively, above the minimum Mooney Viscosity. The listed Mooney Scorch values were measured after 60 minutes at 130° C. In addition, the samples were cured for 25 minutes at 160° C. for the RPA strain sweeps, which was then carried out at 60° C. at 1 Hz. Moreover, the polyindane resins are listed as "PI" and the Impera™ resins are listed as "IMP" in TABLE 5, below.

TABLE 5

| Test | Unit | IMP E1504 | IMP E1602 | IMP E1501 | IMP E1601 | IMP E1503 | IMP E1504 |
|---|---|---|---|---|---|---|---|
| MDR | | | | | | | |
| ML | dNM | 2.63 | 2.7 | 2.78 | 2.68 | 2.86 | 2.68 |
| MH | dNM | 23.07 | 21.93 | 21.92 | 20.2 | 21.65 | 22.76 |
| MH − ML | | 20.44 | 19.23 | 19.14 | 17.52 | 18.79 | 20.08 |
| t90 | mm · mmm | 17.94 | 17.09 | 16.56 | 15.13 | 16.55 | 18.64 |
| MS | | | | | | | |
| Initial Viscosity | MU | 103.3 | 102 | 109.2 | 107.4 | 102.8 | 102.2 |
| Final Viscosity | MU | 67.2 | 67.3 | 69.8 | 69 | 69.2 | 67.8 |
| tMm | m · m | 3.5 | 4.1 | 4.3 | 4 | 3.7 | 4.1 |
| t2 | m · m | 5.6 | 5.7 | 5.8 | 5.6 | 5.4 | 5.7 |
| t5 | m · m | 6.8 | 6.9 | 6.9 | 6.7 | 6.5 | 6.9 |
| t35 | m · m | 11.7 | 11.8 | 11.4 | 11.2 | 11.1 | 11.6 |
| MV Stage 1; 100° C. | | | | | | | |
| Final Viscosity MV Stage 2; 100° C. | MU | 120.7 | 123.6 | 127.6 | 126.6 | 126.3 | 122 |
| Final Viscosity MV Stage 3; 100° C. | MU | 96 | 96.4 | 97.2 | 97.1 | 97.8 | 94.2 |
| Final Viscosity Pico abrasion | MU | 82.7 | 82.9 | 85.4 | 83.7 | 84.4 | 82.9 |
| Avg Weight Loss | g | 0.0172 | 0.0171 | 0.0173 | 0.0173 | 0.0169 | 0.0171 |
| Volume Loss | cm$^3$ | 0.0141 | 0.0141 | 0.0141 | 0.0141 | 0.0139 | 0.014 |
| Abrasion Index | | 130 | 130 | 130 | 130 | 132 | 131 |
| Shore A hardness | Pts. | 68 | 67 | 66 | 65 | 67 | 66 |
| Tensile | | | | | | | |
| Avg Tensile Strain | Mpa | 18.0 | 18.5 | 18.5 | 20.4 | 20.8 | 19.7 |
| Std Dev Tensile Strain | Mpa | 3.253 | 2.58 | 3.231 | 1.149 | 0.314 | 2.19 |
| Avg Elongation | % | 311.2 | 324.7 | 317.6 | 341.4 | 341.3 | 336.2 |
| Std Dev Elongation | % | 44.39 | 29.9 | 48.61 | 16.32 | 6.91 | 29.33 |
| Avg M100 | Mpa | 3.4 | 3.27 | 3.44 | 3.3 | 3.43 | 3.28 |
| Std Dev M100 | Mpa | 0.136 | 0.26 | 0.132 | 0.197 | 0.194 | 0.148 |
| Avg M200 | Mpa | 9.39 | 9.01 | 9.52 | 9.33 | 9.62 | 9.15 |
| Std Dev M200 | Mpa | 0.424 | 0.778 | 0.425 | 0.554 | 0.445 | 0.554 |
| Avg M300 | Mpa | 17.02 | 16.48 | 17.05 | 17.23 | 17.65 | 16.95 |
| Std Dev M300 | Mpa | 0.454 | 9.482 | 9.844 | 0.652 | 0.422 | 0.871 |
| DMA shear strain, 0° C. | | | | | | | |
| tan d at 5% strain | | 0.541 | 0.553 | 0.520 | 0.548 | 0.565 | 0.540 |
| DMA shear strain, 60° C. | | | | | | | |
| tan d at 5% strain | | 0.203 | 0.205 | 0.194 | 0.192 | 0.210 | 0.205 |

| Test | PI 1 (Sample 22) | PI 2 (Sample 23) | PI 3 (Sample 24) | PI 4 (Sample 25) | PI 5 (Sample 26) | PI 6 (Sample 27) | IMP E1504 |
|---|---|---|---|---|---|---|---|
| MDR | | | | | | | |
| ML | 2.75 | 2.67 | 2.79 | 2.77 | 2.75 | 2.68 | 2.62 |
| MH | 22 | 21.47 | 22.34 | 22.53 | 21.66 | 22.13 | 22.42 |
| MH − ML | 19.25 | 18.8 | 19.55 | 19.76 | 18.91 | 19.45 | 19.8 |
| t90 | 15.61 | 15.6 | 16.71 | 16.76 | 16.66 | 16.03 | 17.65 |
| MS | | | | | | | |
| Initial Viscosity | 111.3 | 109.5 | 171.6 | 159.8 | 174.5 | 158.1 | 150.7 |
| Final Viscosity | 71.2 | 69.9 | 82 | 79.6 | 84.9 | 77.2 | 74.5 |
| tMm | 3.6 | 3.8 | 4.4 | 4.6 | 4.5 | 4.2 | 4.4 |
| t2 | 5.3 | 5.7 | 5.4 | 5.7 | 5.3 | 5.8 | 6.1 |

TABLE 5-continued

| | | | | | | | |
|---|---|---|---|---|---|---|---|
| t5 | 6.3 | 6.8 | 6.4 | 6.7 | 6.1 | 6.8 | 7.2 |
| t35 | 10.8 | 11.5 | 10.7 | 11.1 | 9.7 | 11.3 | 12.3 |
| MV Stage 1; 100° C. | | | | | | | |
| Final Viscosity | 129.1 | 132.4 | 127.1 | 123.1 | 122.1 | 124.2 | 123.6 |
| MV Stage 2; 100° C. | | | | | | | |
| Final Viscosity | 98 | 96.9 | 95.2 | 94.4 | 96.4 | 92.5 | 92.5 |
| MV Stage 3; 100° C. | | | | | | | |
| Final Viscosity | 85.6 | 84.4 | 82.8 | 82.1 | 85.9 | 80.2 | 79.6 |
| Pico abrasion | | | | | | | |
| Avg Weight Loss | 0.0162 | 0.0174 | 0.0167 | 0.0167 | 0.0168 | 0.0173 | 0.017 |
| Volume Loss | 0.0133 | 0.0142 | 0.0137 | 0.0137 | 0.0137 | 0.0142 | 0.0139 |
| Abrasion Index | 138 | 129 | 134 | 134 | 134 | 129 | 131.82 |
| Shore A hardness | 66 | 66 | 66 | 66 | 66 | 66 | 60 |
| Tensile | | | | | | | |
| Avg Tensile Strain | 17.1 | 19.4 | 18.0 | 17.1 | 18.3 | 18.2 | 19.4 |
| Std Dev Tensile Strain | 2.144 | 2.205 | 2.316 | 3.283 | 2.678 | 2.561 | 1.67 |
| Avg Elongation | 299.7 | 343.3 | 314.4 | 296.7 | 316 | 323.4 | 330.4 |
| Std Dev Elongation | 29.3 | 34.48 | 38.91 | 48.76 | 40.06 | 40.5 | 21.45 |
| Avg M100 | 3.47 | 3.34 | 3.47 | 3.56 | 3.38 | 3.33 | 3.51 |
| Std Dev M100 | 0.196 | 0.172 | 0.31 | 0.176 | 0.215 | 0.13 | 0.222 |
| Avg M200 | 9.57 | 9.05 | 9.48 | 9.82 | 9.38 | 9.08 | 9.59 |
| Std Dev M200 | 0.475 | 0.425 | 0.775 | 0.607 | 0.654 | 0.436 | 0.443 |
| Avg M300 | 14.31 | 15.06 | 16.61 | 17.26 | 17.12 | 12.87 | 17.19 |
| Std Dev M300 | 9.991 | 2.817 | 9.715 | 17.298 | 9.937 | 4.02 | 0.47 |
| DMA shear strain, 0° C. | | | | | | | |
| tan d at 5% strain | 0.604 | 0.583 | 0.571 | 0.558 | 0.568 | 0.562 | 0.547 |
| DMA shear strain, 60° C. | | | | | | | |
| tan d at 5% strain | 0.203 | 0.200 | 0.194 | 0.194 | 0.195 | 0.196 | 0.209 |

Figure 6:
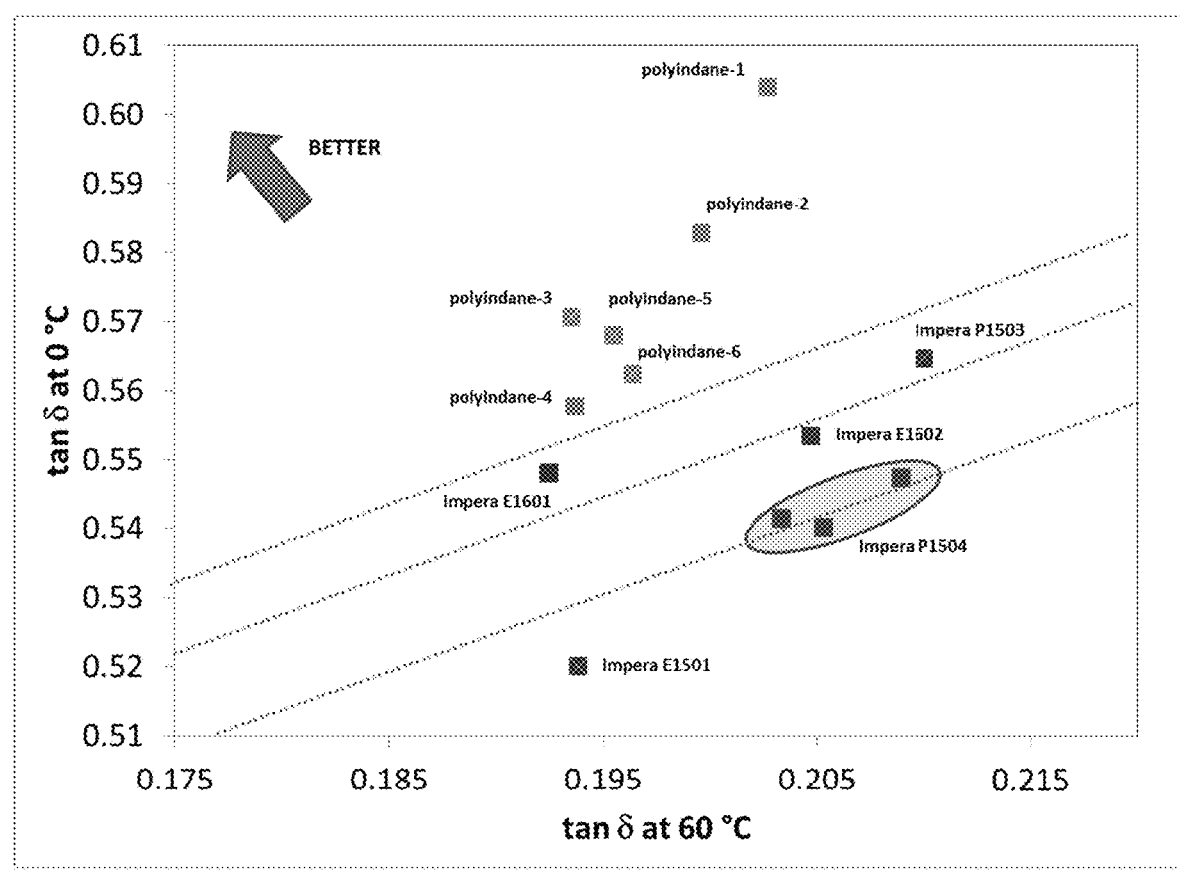
FIG. 6 is a graph comparing the wet grip and the rolling resistance of the elastomeric formulations produced in the Examples.

The properties of the formed elastomeric compositions are shown above in TABLE 5. Within standard deviation, it is shown that the polyindane resins have similar compound properties to the comparative commercial Impera™ resins. Tan delta at 0° C. at 5% strain is typically used to evaluate tire tread wet traction performance and tan delta at 60° C. at 5% strain is generally used to evaluate rolling resistance performance, with higher values indicating an improvement in regard to wet grip and lower values indicating an improvement in regard to rolling resistance. The results shown in FIG. 6 illustrate that the new polyindane based resins provide a significant improvement in wet grip, while not having a detriment on rolling resistance.

Example 31

This set of examples is used to illustrate a compound with 100% sSBR, at two typical resin loadings. This is typical of a summer tire formulation as shown in TABLE 6. The elastomeric compositions were produced following the procedure in TABLE 4. Various properties of the elastomeric compositions are shown in TABLE 7. The improvement is noted in the increased tan delta at 0° C. indicating wet grip performance (higher better) vs tan delta at 60° C. indicating rolling resistance performance (lower better).

TABLE 6

| | Density (g/cc) | 101 | 102 | 103 | 104 | 105 | 106 | 107 | 108 |
|---|---|---|---|---|---|---|---|---|---|
| First Stage | | | | | | | | | |
| Trinseo ™ 6430 (sSBR) | 0.95 | 137.5 | 137.5 | 137.5 | 137.5 | 137.5 | 137.5 | 137.5 | 137.5 |
| 7000GR (Silica) | 2 | 80 | 80 | 80 | 80 | 80 | 80 | 80 | 80 |
| Si69 Silane Coupling Agent | 1.1 | 6.4 | 6.4 | 6.4 | 6.4 | 6.4 | 6.4 | 6.4 | 6.4 |
| N234 Carbon Black | 1.85 | 10 | 10 | 10 | 10 | 10 | 10 | 10 | 10 |

TABLE 6-continued

|  | Density (g/cc) | 101 | 102 | 103 | 104 | 105 | 106 | 107 | 108 |
|---|---|---|---|---|---|---|---|---|---|
| TDAE Oil | 0.94 | 10 |  |  |  | 20 |  |  |  |
| Santoflex ™ 6PPD (anti-oxidant) | 0.99 | 2 | 2 | 2 | 2 | 2 | 2 | 2 | 2 |
| Stearic Acid | 0.85 | 1 | 1 | 1 | 1 | 1 | 1 | 1 | 1 |
| Zinc Oxide | 5.57 | 3 | 3 | 3 | 3 | 3 | 3 | 3 | 3 |
| Nochek ™ 4729A (wax) | 0.91 | 1 | 1 | 1 | 1 | 1 | 1 | 1 | 1 |
| Impera ™ P1504 | 1 |  | 10 |  |  | 20 |  |  |  |
| Impera ™ E1601 | 1 |  |  | 10 |  |  |  | 20 |  |
| Sample 22 | 1 |  |  |  | 10 |  |  |  | 20 |
| Total phr Second Stage Stock |  | 250.90 | 250.90 | 250.90 | 250.90 | 260.90 | 260.90 | 260.90 | 260.90 |
| First stage stock |  | 250.90 | 250.90 | 250.90 | 250.90 | 260.90 | 260.90 | 260.90 | 260.90 |
| Total phr Third Stage Stock |  | 250.90 | 250.90 | 250.90 | 250.90 | 260.90 | 260.90 | 260.90 | 260.90 |
| Second stage stock |  | 250.90 | 250.90 | 250.90 | 250.90 | 260.90 | 260.90 | 260.90 | 260.90 |
| Diphenyl Guanidine | 1.18 | 2 | 2 | 2 | 2 | 2 | 2 | 2 | 2 |
| n-cyclohexyl-2-benzothiazole sulfonamide | 1.28 | 1.5 | 1.5 | 1.5 | 1.5 | 1.5 | 1.5 | 1.5 | 1.5 |
| Sulfur (Rubbermakers) | 2.08 | 1.5 | 1.5 | 1.5 | 1.5 | 1.5 | 1.5 | 1.5 | 1.5 |
| Total phr |  | 255.90 | 255.90 | 255.90 | 255.90 | 265.90 | 265.90 | 265.90 | 265.90 |

[1] n-cyclohexyl-2-benzothiazole sulfonamide

TABLE 7

|  |  | 101 | 102 | 103 | 104 | 105 | 106 | 107 | 108 |
|---|---|---|---|---|---|---|---|---|---|
| MDR |  |  |  |  |  |  |  |  |  |
| ML | dNM | 4.58 | 4.6 | 4.52 | 4.5 | 3.99 | 4.09 | 4.32 | 4.04 |
| MH | dNM | 19.54 | 19.74 | 19.55 | 19.63 | 16.52 | 17.31 | 17.29 | 16.99 |
| t90 | mm · mmm | 16.24 | 15.71 | 16.79 | 15.9 | 15.61 | 16.34 | 16.8 | 16.37 |
| MH − ML | dNM | 14.96 | 15.14 | 15.03 | 15.13 | 12.53 | 13.22 | 12.97 | 12.95 |
| Mooney Scorch |  |  |  |  |  |  |  |  |  |
| Initial Viscosity | MU | 118.3 | 123 | 123.5 | 125 | 101.8 | 111.2 | 111 | 110.2 |
| tMm | m · m | 3.1 | 2.3 | 3.3 | 3.8 | 3.8 | 1.8 | 0.9 | 3.4 |
| t2 | m · m | 3.2 | 2.5 | 3.5 | 4 | 4 | 2 | 1 | 3.6 |
| t5 | m · m | 4.8 | 5.4 | 5.9 | 6 | 6.9 | 5.6 | 3 | 7.1 |
| t35 | m · m | 12.8 | 12 | 11.9 | 12 | 14.9 | 14.5 | 17.9 | 14.5 |
| ML(1 + 4) | MU | 110.8 | 121.6 | 121.1 | 122 | 99.6 | 111.7 | 114.7 | 108 |
| Final Mooney Viscosity Stage 1 | MU | 123 | 138.1 | 142.2 | 139.7 | 117.5 | 128.3 | 132.8 | 130.9 |
| Final Mooney Viscosity Stage 2 | MU | 132 | 146 | 146.3 | 146.5 | 117.1 | 130.6 | 129.1 | 129 |
| Final Mooney Viscosity Stage 3 | MU | 122.8 | 129.4 | 129.6 | 130.2 | 106.9 | 116.3 | 116 | 114.6 |
| Pico Abrasion |  |  |  |  |  |  |  |  |  |
| Avg Weight Loss | g | 0.0246 | 0.0231 | 0.0216 | 0.022 | 0.0252 | 0.0257 | 0.0279 | 0.0251 |
| Volume Loss | cm3 | 0.0205 | 0.0192 | 0.0179 | 0.0183 | 0.0213 | 0.0215 | 0.0233 | 0.021 |
| Abrasion Index |  | 98 | 105 | 112 | 110 | 94 | 94 | 86 | 96 |
| Shore A |  |  |  |  |  |  |  |  |  |
| Hardness | points | 63 | 64 | 63 | 62 | 59 | 60 | 60 | 60 |

TABLE 7-continued

|  |  | 101 | 102 | 103 | 104 | 105 | 106 | 107 | 108 |
|---|---|---|---|---|---|---|---|---|---|
| Tensile Properties |  |  |  |  |  |  |  |  |  |
| Avg Tensile Strain | Mpa | 23.54 | 24.87 | 25.09 | 24.79 | 23.06 | 23.04 | 22.66 | 21.43 |
| Std Dev Tensile Strain | Mpa | 3.129 | 1.373 | 3.605 | 2.942 | 1.904 | 2.799 | 2.162 | 3.125 |
| Avg Elongation | % | 441.1 | 455 | 447.6 | 440.2 | 493.6 | 477.9 | 479.9 | 471.9 |
| Std Dev Elongation | % | 51.88 | 17.79 | 49.43 | 44.54 | 34.3 | 46.53 | 47.88 | 60.14 |
| Avg M100 | Mpa | 2.83 | 2.85 | 2.95 | 2.93 | 2.32 | 2.35 | 2.43 | 2.29 |
| Std Dev M100 | Mpa | 0.104 | 0.085 | 0.031 | 0.081 | 0.094 | 0.038 | 0.088 | 0.067 |
| Avg M200 | Mpa | 7.87 | 8.06 | 8.35 | 8.45 | 6.3 | 6.58 | 6.45 | 6.21 |
| Std Dev M200 | Mpa | 0.333 | 0.265 | 0.159 | 0.297 | 0.312 | 0.059 | 0.308 | 0.305 |
| Avg M300 | Mpa | 14.48 | 14.83 | 15.29 | 15.49 | 11.87 | 12.47 | 12.13 | 11.71 |
| Std Dev M300 | Mpa | 0.55 | 0.387 | 0.33 | 0.469 | 0.533 | 0.103 | 0.578 | 0.564 |
| Strain sweep |  |  |  |  |  |  |  |  |  |
| tanδ at 0° C. |  | 0.777 | 0.972 | 0.981 | 1.014 | 0.745 | 1.156 | 1.152 | 1.307 |
| tanδ at 60° C. |  | 0.177 | 0.180 | 0.184 | 0.184 | 0.173 | 0.189 | 0.195 | 0.181 |

Example 32

This set of examples is used to illustrate a compound with 100% sSBR with low styrene and vinyl content at relatively high resin loading. The elastomeric compositions shown in TABLE 8 were produced by the procedure described in TABLE 4. Various properties of the elastomeric compositions are shown in TABLE 9. The low styrene and vinyl content result in a low Tg polymer, which has poor wet grip. Addition of resin improves wet grip (tan delta at 0 C). The improvement is stronger with the resin disclosed here. The improvement is noted in the increased tan delta at 0° C. indicating wet grip performance (higher better) vs tan delta at 60° C. indicating rolling resistance performance (lower better).

TABLE 8

|  | Density (g/cc) | 109 | 110 | 111 | 112 | 113 | 114 | 115 | 116 | 117 | 118 |
|---|---|---|---|---|---|---|---|---|---|---|---|
| First Stage |  |  |  |  |  |  |  |  |  |  |  |
| Trinseo ™ 3402 (sSBR) | 0.95 | 100 | 100 | 100 | 100 | 100 | 100 | 100 | 100 | 100 | 100 |
| 7000GR (Silica) | 2 | 80 | 80 | 80 | 80 | 90 | 90 | 90 | 90 | 85 | 100 |
| Si69 Silane Coupling Agent | 1.1 | 6.4 | 6.4 | 6.4 | 6.4 | 7.2 | 7.2 | 7.2 | 7.2 | 6.8 | 8 |
| N234 Carbon Black | 1.85 | 10 | 10 | 10 | 10 | 10 | 10 | 10 | 10 | 10 | 10 |
| TDAE Oil | 0.94 | 30 | 0 | 0 | 0 | 45 | 0 | 0 | 0 | 30 | 45 |
| Santoflex ™ 6PPD (A.O.) | 0.99 | 2 | 2 | 2 | 2 | 2 | 2 | 2 | 2 | 2 | 2 |
| Stearic Acid | 0.85 | 1 | 1 | 1 | 1 | 1 | 1 | 1 | 1 | 1 | 1 |
| Zinc Oxide | 5.57 | 3 | 3 | 3 | 3 | 3 | 3 | 3 | 3 | 3 | 3 |
| Nochek ™ 4729A (wax) | 0.91 | 1 | 1 | 1 | 1 | 1 | 1 | 1 | 1 | 1 | 1 |
| Impera ™ P1504 | 1 |  | 30 |  |  |  | 45 |  |  |  |  |
| Impera ™ E1601 | 1 |  |  | 30 |  |  |  | 45 |  |  |  |
| Sample 22 | 1 |  |  |  | 30 |  |  |  | 45 |  |  |
| Total phr Second Stage Stock |  | 233.40 | 233.40 | 233.40 | 233.40 | 259.20 | 259.20 | 259.20 | 259.20 | 238.80 | 270.00 |
| First stage stock |  | 233.40 | 233.40 | 233.40 | 233.40 | 259.20 | 259.20 | 259.20 | 259.20 | 238.80 | 270.00 |
| Total phr Third Stage Stock |  | 233.40 | 233.40 | 233.40 | 233.40 | 259.20 | 259.20 | 259.20 | 259.20 | 238.80 | 270.00 |
| Second stage stock |  | 233.40 | 233.40 | 233.40 | 233.40 | 259.20 | 259.20 | 259.20 | 259.20 | 238.80 | 270.00 |
| Diphenyl Guanidine | 1.18 | 2 | 2 | 2 | 2 | 2 | 2 | 2 | 2 | 2 | 2 |
| n-cyclohexyl-2-benzothiazole sulfonamide | 1.28 | 1.5 | 1.5 | 1.5 | 1.5 | 1.5 | 1.5 | 1.5 | 1.5 | 1.5 | 1.5 |

TABLE 8-continued

| | Density (g/cc) | 109 | 110 | 111 | 112 | 113 | 114 | 115 | 116 | 117 | 118 |
|---|---|---|---|---|---|---|---|---|---|---|---|
| Sulfur (Rubbermakers) | 2.08 | 1.5 | 1.5 | 1.5 | 1.5 | 1.5 | 1.5 | 1.5 | 1.5 | 1.5 | 1.5 |
| Total phr | | 238.40 | 238.40 | 238.40 | 238.40 | 264.20 | 264.20 | 264.20 | 264.20 | 243.80 | 275.00 |

TABLE 9

| | | 109 | 110 | 111 | 112 | 113 | 114 | 115 | 116 | 117 | 118 |
|---|---|---|---|---|---|---|---|---|---|---|---|
| MDR | | | | | | | | | | | |
| ML | dNM | 4.54 | 5.41 | 5.62 | 5.48 | 3.82 | 5.07 | 5.61 | 5.15 | 5.03 | 4.42 |
| MH | dNM | 21.95 | 24.11 | 23.13 | 23.79 | 18.75 | 21.44 | 20.76 | 19.74 | 23.39 | 21.16 |
| t90 | mm · mmm | 15.7 | 16.35 | 17.07 | 16.58 | 20.23 | 20.25 | 20.54 | 21.08 | 17.93 | 21.47 |
| MH − ML | dNM | 17.41 | 18.7 | 17.51 | 18.31 | 14.93 | 16.37 | 15.15 | 14.59 | 18.36 | 16.74 |
| Mooney Scorch | | | | | | | | | | | |
| Initial Viscosity | MU | 80.6 | 98.7 | 96.8 | 94.3 | 65.1 | 87.6 | 110.2 | 94.5 | 82.2 | 73.6 |
| Minimum Viscosity | MU | 56.6 | 72.5 | 75 | 73.5 | 44.7 | 63.7 | 70 | 66.3 | 61.5 | 52 |
| TMm | m · m | 6.3 | 5.6 | 6.7 | 5.4 | 8.4 | 6.6 | 6.3 | 6.3 | 8.3 | 7.8 |
| t2 | m · m | 11.5 | 9.3 | 9.3 | 8.6 | 13.2 | 10.4 | 9.4 | 9.5 | 11 | 11 |
| t5 | m · m | 16 | 12.7 | 11.9 | 11.1 | 20 | 14.4 | 11.9 | 12.9 | 15 | 15.1 |
| t35 | m · m | 29.7 | 23.8 | 21.2 | 20 | 38.7 | 28.8 | 20.9 | 25.8 | 27.8 | 32.1 |
| Final Viscosity Stage 1 | MU | 82.8 | 105.3 | 110 | 110.2 | 65.4 | 101.7 | 109.1 | 104.3 | 82.7 | 74.9 |
| Final Viscosity Stage 2 | MU | 75.1 | 96.5 | 101.8 | 98.2 | 59.4 | 89.1 | 95.3 | 89.8 | 80.3 | 66 |
| Final Viscosity Stage 3 | MU | 67.8 | 86.8 | 89.8 | 88.1 | 54.5 | 78 | 83.6 | 79.5 | 71.9 | 59.6 |
| Pico Abrasion | | | | | | | | | | | |
| Avg Weight Loss | g | 0.017 | 0.0149 | 0.0139 | 0.0133 | 0.0196 | 0.0151 | 0.0148 | 0.0144 | 0.0175 | 0.0183 |
| Volume Loss | cm3 | 0.0141 | 0.0122 | 0.0113 | 0.0108 | 0.0162 | 0.0122 | 0.012 | 0.0117 | 0.0144 | 0.015 |
| Abrasion Index | | 130 | 151 | 162 | 169 | 113 | 149 | 152 | 156 | 127 | 122 |
| Shore A | | | | | | | | | | | |
| Hardness | points | 64 | 67 | 67 | 67 | 61 | 65 | 65 | 64 | 65 | 64 |
| Avg Tensile Strain | Mpa | 20.07 | 26.36 | 19.52 | 23.29 | 19.76 | 22.64 | 20.68 | 25.35 | 22.12 | 18.91 |
| Std Dev Tensile Strain | Mpa | 3.164 | 2.657 | 4.618 | 4.436 | 1.105 | 4.892 | 3.84 | 2.745 | 0.945 | 1.804 |
| Avg Elongation | % | 392.3 | 443.7 | 345.4 | 392.6 | 448.4 | 425.3 | 387.9 | 494.8 | 416.9 | 413.1 |
| Std Dev Elongation | % | 44.78 | 40.48 | 58.02 | 62.29 | 21.03 | 68.78 | 59.49 | 49.83 | 13.64 | 32.16 |
| Avg M100 | Mpa | 2.57 | 3.09 | 3.18 | 3.18 | 2.22 | 2.96 | 3.07 | 2.63 | 2.61 | 2.38 |
| Std Dev M100 | Mpa | 0.052 | 0.061 | 0.057 | 0.055 | 0.066 | 0.047 | 0.063 | 0.079 | 0.085 | 0.145 |
| Avg M200 | Mpa | 6.6 | 7.9 | 8.31 | 8.33 | 5.39 | 7.45 | 7.85 | 6.5 | 6.69 | 5.87 |
| Std Dev M200 | Mpa | 0.196 | 0.232 | 0.18 | 0.232 | 0.22 | 0.16 | 0.264 | 0.314 | 0.276 | 0.452 |
| Avg M300 | Mpa | 13.21 | 15.27 | 11.33 | 16.02 | 10.68 | 14.1 | 13.3 | 12.6 | 13.42 | 11.63 |
| Std Dev M300 | Mpa | 0.417 | 0.445 | 6.602 | 0.444 | 0.42 | 0.32 | 2.738 | 0.704 | 0.527 | 0.808 |
| Strain sweep | | | | | | | | | | | |
| tanδ at 0° C. | | 0.292 | 0.456 | 0.449 | 0.510 | 0.314 | 0.616 | 0.638 | 0.786 | 0.316 | 0.354 |
| tanδ at 60° C. | | 0.144 | 0.175 | 0.171 | 0.167 | 0.157 | 0.197 | 0.185 | 0.180 | 0.156 | 0.173 |

Example 33

This set of examples is used to illustrate a compound with 70/30 sSBR/BR, with carbon black loading instead of silica as in the previous examples. The elastomeric composition formulations are shown in Table 10, and the properties of these compositions are shown in Table 11. The elastomeric compositions were produced using the procedure outlined in Table 4. The improvement is noted in the increased tan delta at 0° C. indicating wet grip performance (higher better) vs tan delta at 60° C. indicating rolling resistance performance (lower better).

TABLE 10

|  | Density (g/cc) | 119 | 120 | 121 | 122 | 123 | 124 |
|---|---|---|---|---|---|---|---|
| First Stage | | | | | | | |
| Duradene ™ 738 (sSBR) | 0.95 | 70 | 70 | 70 | 70 | 70 | 70 |
| 140 ND (BR) | 0.91 | 30 | 30 | 30 | 30 | 30 | 30 |
| N234 Carbon Black | 1.85 | 75 | 75 | 75 | 75 | 75 | 75 |
| TDAE Oil | 0.94 | 10 | 10 | 10 | 10 | 10 | 10 |
| Impera ™ P1504 | 1 | 20 | | | | | |
| Impera ™ E1501 | 1 | | 20 | | | | |
| Impera ™ E1601 | 1 | | | 20 | | | |
| Impera ™ P1503 | 1 | | | | 20 | | |
| Impera ™ E1602 | 1 | | | | | 20 | |
| Example 22 | 1 | | | | | | 20 |
| Zinc Oxide | 5.57 | 3 | 3 | 3 | 3 | 3 | 3 |
| Stearic Acid | 0.85 | 1 | 1 | 1 | 1 | 1 | 1 |
| Santoflex ™ 6PPD (antioxidant) | 0.99 | 2 | 2 | 2 | 2 | 2 | 2 |
| Nochek ™ 4729A (wax) | 0.91 | 1 | 1 | 1 | 1 | 1 | 1 |
| Total phr | | 212.00 | 212.00 | 212.00 | 212.00 | 212.00 | 212.00 |
| Second Stage Stock | | | | | | | |
| First stage stock | | 212.00 | 212.00 | 212.00 | 212.00 | 212.00 | 212.00 |
| Total phr | | 212.00 | 212.00 | 212.00 | 212.00 | 212.00 | 212.00 |
| Third Stage Stock | | | | | | | |
| Second stage stock | | 212.00 | 212.00 | 212.00 | 212.00 | 212.00 | 212.00 |
| N-tert-butyl-2-benzothiazyl sulfenamide | 1.28 | 1.2 | 1.2 | 1.2 | 1.2 | 1.2 | 1.2 |
| Sulfur (Rubbermakers) | 2.08 | 1.5 | 1.5 | 1.5 | 1.5 | 1.5 | 1.5 |
| Total phr | | 214.70 | 214.70 | 214.70 | 214.70 | 214.70 | 214.70 |

TABLE 11

|  |  | 119 | 120 | 121 | 122 | 123 | 124 |
|---|---|---|---|---|---|---|---|
| MDR | | | | | | | |
| ML | dNM | 2.84 | 2.95 | 3.02 | 2.92 | 3.03 | 2.98 |
| MH | dNM | 17.77 | 17.28 | 17.88 | 17.63 | 17.88 | 17.87 |
| Delta Torque | dNM | 14.93 | 14.33 | 14.86 | 14.71 | 14.85 | 14.89 |
| t90 | mm · mmm | 10.66 | 11.09 | 12.38 | 11 | 11.39 | 11.07 |
| Mooney Scorch | | | | | | | |
| Initial Viscosity | MU | 81.6 | 81 | 83.5 | 82.2 | 87.1 | 87.6 |
| Minimum Viscosity | MU | 55.5 | 56.6 | 58 | 55.6 | 54.6 | 54.7 |
| TMm | m · m | 6 | 6.6 | 6.6 | 6.3 | 8.9 | 7.8 |
| t2 | m · m | 9.5 | 9.7 | 10.2 | 10.1 | 12.2 | 12.2 |
| t5 | m · m | 25.1 | 27.2 | 28.7 | 25.5 | 27 | 24.6 |
| t35 | m · m | 33.4 | 34.8 | 37.4 | 34.2 | 35.6 | 34.3 |
| ML(1 + 4) Mooney Viscosity Stage 1 | MU | 56 | 57.1 | 58.7 | 56.3 | 55.6 | 55.8 |
| Final Viscosity Mooney Viscosity Stage 2 | MU | 93.1 | 95.6 | 99.3 | 95.7 | 93.6 | 95.6 |
| Final Viscosity Mooney Viscosity Stage 3 | MU | 87.1 | 88.5 | 91.7 | 88 | 87.2 | 87.9 |
| Final Viscosity | MU | 78.1 | 79.7 | 82.5 | 79.7 | 78.3 | 79.1 |

TABLE 11-continued

|  |  | 119 | 120 | 121 | 122 | 123 | 124 |
|---|---|---|---|---|---|---|---|
| Pico abrasion |  |  |  |  |  |  |  |
| Avg Weight Loss | g | 0.0136 | 0.0143 | 0.014 | 0.0136 | 0.0135 | 0.0135 |
| Volume Loss | cm3 | 0.0118 | 0.0124 | 0.0122 | 0.0116 | 0.0117 | 0.0117 |
| Abrasion Index |  | 157 | 149 | 152 | 159 | 159 | 159 |
| Shore A |  |  |  |  |  |  |  |
| Hardness | points | 66 | 65 | 66 | 66 | 65 | 65 |
| Tensile properties |  |  |  |  |  |  |  |
| Avg Tensile Strain | Mpa | 19.27 | 19.45 | 20.47 | 21.37 | 19.33 | 20.41 |
| Std Dev Tensile Strain | Mpa | 2.205 | 1.356 | 0.942 | 0.233 | 1.786 | 0.781 |
| Avg Elongation | % | 426.5 | 479.8 | 485.7 | 479.4 | 446.3 | 443.2 |
| Std Dev Elongation | % | 46.61 | 41.81 | 22.28 | 9.99 | 36.92 | 15.82 |
| Avg M100 | Mpa | 2.65 | 2.45 | 2.53 | 2.75 | 2.56 | 2.65 |
| Std Dev M100 | Mpa | 0.024 | 0.078 | 0.038 | 0.037 | 0.048 | 0.075 |
| Avg M200 | Mpa | 6.82 | 6.12 | 6.3 | 7.03 | 6.51 | 7 |
| Std Dev M200 | Mpa | 0.104 | 0.329 | 0.191 | 0.139 | 0.181 | 0.2 |
| Avg M300 | Mpa | 12.63 | 11.33 | 11.7 | 12.74 | 12.08 | 12.96 |
| Std Dev M300 | Mpa | 0.167 | 0.529 | 0.35 | 0.218 | 0.294 | 0.139 |
| DMA shear strain sweep, 5% |  |  |  |  |  |  |  |
| tanδ at 0° C. |  | 0.559 | 0.544 | 0.572 | 0.594 | 0.567 | 0.623 |
| tanδ at 60° C. |  | 0.293 | 0.308 | 0.320 | 0.304 | 0.302 | 0.294 |

Example 34

This set of examples is used to illustrate a compound with 70/30 sSBR/BR compound with a high styrene sSBR utilized instead of high vinyl, as in Example 30. This is typical of a summer tire formulation. The elastomeric compositions are shown in TABLE 12, and the properties of these compositions are shown in TABLE 13. The elastomeric compositions were produced using the procedure in TABLE 4. The improvement is noted in the increased tan delta at 0° C. indicating wet grip performance (higher better) vs tan delta at 60° C. indicating rolling resistance performance (lower better).

TABLE 12

|  | Density (g/cc) | 125 | 126 | 127 | 128 | 129 | 130 | 131 |
|---|---|---|---|---|---|---|---|---|
| First Stage |  |  |  |  |  |  |  |  |
| Trinseo ™ 6430 (sSBR) | 0.95 | 96.25 | 96.25 | 96.25 | 96.25 | 96.25 | 96.25 | 96.25 |
| 140 ND (BR) | 0.91 | 30 | 30 | 30 | 30 | 30 | 30 | 30 |
| Ultrasil ™ 7000GR (Silica) | 2 | 80 | 80 | 80 | 80 | 80 | 80 | 80 |
| N234 Carbon Black | 1.85 | 10 | 10 | 10 | 10 | 10 | 10 | 10 |
| Si69 Silane Coupling Agent | 1.1 | 6.4 | 6.4 | 6.4 | 6.4 | 6.4 | 6.4 | 6.4 |
| Impera ™ P1504 | 1 | 20 |  |  |  |  |  |  |
| Sample 22 | 1 |  | 20 |  |  |  |  |  |
| H2 Sample 22 | 1 |  |  | 20 |  |  |  |  |
| Impera ™ E1501 | 1 |  |  |  | 20 |  |  |  |
| Impera ™ E1602 | 1 |  |  |  |  | 20 |  |  |
| Impera ™ E1601 | 1 |  |  |  |  |  | 20 |  |
| Impera ™ P1503 | 1 |  |  |  |  |  |  | 20 |
| Zinc Oxide | 5.57 | 3 | 3 | 3 | 3 | 3 | 3 | 3 |
| Stearic Acid | 0.85 | 1 | 1 | 1 | 1 | 1 | 1 | 1 |
| Santoflex ™ 6PPD (anti-oxidant) | 0.99 | 2 | 2 | 2 | 2 | 2 | 2 | 2 |
| Nochek ™ 4729A (wax) | 0.91 | 1 | 1 | 1 | 1 | 1 | 1 | 1 |
| Total phr |  | 249.65 | 249.65 | 249.65 | 249.65 | 249.65 | 249.65 | 249.65 |
| Second Stage Stock |  |  |  |  |  |  |  |  |
| First stage stock |  | 249.65 | 249.65 | 249.65 | 249.65 | 249.65 | 249.65 | 249.65 |
| Total phr |  | 249.65 | 249.65 | 249.65 | 249.65 | 249.65 | 249.65 | 249.65 |

TABLE 12-continued

|  | Density (g/cc) | 125 | 126 | 127 | 128 | 129 | 130 | 131 |
|---|---|---|---|---|---|---|---|---|
| Third Stage Stock |  |  |  |  |  |  |  |  |
| Second stage stock |  | 249.65 | 249.65 | 249.65 | 249.65 | 249.65 | 249.65 | 249.65 |
| n-cyclohexyl-2-benzothiazole sulfonamide | 1.28 | 1.5 | 1.5 | 1.5 | 1.5 | 1.5 | 1.5 | 1.5 |
| Diphenyl Guanidine | 1.18 | 2 | 2 | 2 | 2 | 2 | 2 | 2 |
| Sulfur (Rubbermakers) | 2.08 | 1.5 | 1.5 | 1.5 | 1.5 | 1.5 | 1.5 | 1.5 |
| Total phr |  | 254.65 | 254.65 | 254.65 | 254.65 | 254.65 | 254.65 | 254.65 |

TABLE 13

|  |  | 125 | 126 | 127 | 128 | 129 | 130 | 131 |
|---|---|---|---|---|---|---|---|---|
| MDR |  |  |  |  |  |  |  |  |
| ML | dNM | 4.22 | 4.23 | 4.13 | 4.22 | 4.14 | 4.26 | 4.31 |
| MH | dNM | 20.03 | 19.32 | 19.07 | 19.26 | 19.32 | 19.21 | 19.98 |
| Delta Torque | dNM | 15.81 | 15.09 | 14.94 | 15.04 | 15.18 | 14.95 | 15.67 |
| t90 | mm · mmm | 12.94 | 12.84 | 13.01 | 12.89 | 12.71 | 12.9 | 13.45 |
| Mooney scorch |  |  |  |  |  |  |  |  |
| Initial Viscosity | MU | 105 | 106.1 | 105.4 | 107.3 | 118.6 | 120.9 | 122.9 |
| Minimum Viscosity | MU | 91.7 | 90.7 | 89.8 | 91.7 | 91.5 | 92.6 | 94.3 |
| tMm | m · m | 4.5 | 5.4 | 4.6 | 3.7 | 5.5 | 5.7 | 5.7 |
| t2 | m · m | 7.1 | 7.5 | 7 | 6.5 | 8.1 | 8.5 | 8.7 |
| t5 | m · m | 9.3 | 9.7 | 8.9 | 8.5 | 10.5 | 10.7 | 10.9 |
| t35 | m · m | 17.5 | 18.1 | 16.9 | 15.4 | 18.7 | 19.1 | 19.2 |
| ML(1 + 4) | MU | 91.8 | 91.1 | 90 | 91.9 | 92.1 | 93.4 | 95.2 |
| Final Mooney Viscosity Stage 1 | MU | 150.7 | 149.3 | 148.5 | 148.1 | 148.6 | 152.5 | 153.3 |
| Mooney Viscosity Stage 2 | MU | 118.8 | 118.4 | 115.2 | 116.3 | 115.9 | 117.6 | 119.8 |
| Mooney Viscosity Stage 3 | MU | 101.2 | 99.8 | 98.4 | 100.4 | 100.3 | 100.7 | 103.1 |
| PICO abrasion |  |  |  |  |  |  |  |  |
| Avg Weight Loss | g | 0.0209 | 0.0206 | 0.0201 | 0.0213 | 0.021 | 0.0206 | 0.0213 |
| Volume Loss | cm3 | 0.0171 | 0.0169 | 0.0166 | 0.0175 | 0.0173 | 0.0169 | 0.0175 |
| Abrasion Index |  | 116.05 | 117.52 | 119.47 | 113.6 | 114.55 | 117.43 | 113.53 |
| Shore A |  |  |  |  |  |  |  |  |
| Hardness | points | 61 | 59 | 59 | 59 | 59 | 59 | 60 |
| Tensile properties |  |  |  |  |  |  |  |  |
| Avg Tensile Strain | Mpa | 23.12 | 24.48 | 22.32 | 24.12 | 22.6 | 23.86 | 22.74 |
| Std Dev Tensile Strain | Mpa | 1.903 | 2.501 | 2.146 | 1.942 | 2.414 | 1.348 | 2.119 |
| Avg Elongation | % | 521.6 | 550.6 | 509.6 | 540.3 | 513.5 | 529.6 | 511.2 |
| Std Dev Elongation | % | 35.26 | 47.47 | 47.16 | 48.62 | 43.64 | 30.46 | 52.03 |
| Avg M100 | Mpa | 2.1 | 2.04 | 2.07 | 2.08 | 2.09 | 2.12 | 2.17 |
| Std Dev M100 | Mpa | 0.038 | 0.064 | 0.042 | 0.065 | 0.054 | 0.049 | 0.049 |
| Avg M200 | Mpa | 5.6 | 5.44 | 5.57 | 5.61 | 5.6 | 5.74 | 5.8 |
| Std Dev M200 | Mpa | 0.149 | 0.232 | 0.178 | 0.281 | 0.219 | 0.21 | 0.262 |
| Avg M300 | Mpa | 10.86 | 10.67 | 10.81 | 10.89 | 10.85 | 11.13 | 11.14 |
| Std Dev M300 | Mpa | 0.268 | 0.382 | 0.335 | 0.504 | 0.397 | 0.37 | 0.456 |
| DMA strain sweep |  |  |  |  |  |  |  |  |
| tanδ @ 0° C., 5% | — | 0.779 | 0.829 | 0.752 | 0.682 | 0.735 | 0.711 | 0.825 |
| tanδ @ 60° C., 5% | — | 0.196 | 0.190 | 0.193 | 0.190 | 0.194 | 0.190 | 0.207 |

Definitions

It should be understood that the following is not intended to be an exclusive list of defined terms. Other definitions may be provided in the foregoing description, such as, for example, when accompanying the use of a defined term in context.

s used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A tire component comprising an elastomeric composition, said elastomeric composition comprising at least one elastomer and at least one polyindane resin; wherein said elastomer is selected from the group consisting of natural rubber, styrene-butadiene rubber, butadiene rubber, ethylene propylene diene polymers, ethylene-propylene copolymers, butyl rubber, and halobutyl rubbers; wherein said polyindane resin exhibits a glass transition temperature ("Tg") in the range of 10° C. to 150° C.; wherein said polyindane resin comprises a number average molecular weight (Mn) in the range of 300 g/mol to 5,000 g/mol, and wherein there is a substantial absence of polyphenylene ether.

2. The tire component of claim 1, wherein said elastomeric composition comprises 1 to 100 phr of said polyindane resin.

3. The tire component of claim 1, wherein said elastomeric composition comprises 3 to 60 phr of said polyindane resin.

4. The tire component of claim 1, wherein said polyindane resin is derived from a diisopropenyl-substituted aromatic compound.

5. The tire component of claim 1, wherein said tire component comprises a tire tread, tire subtread, tire undertread, and/or tire sidewall.

6. A tire component comprising an elastomeric composition, said elastomeric composition comprising at least one elastomer, a polyindane resin, and one or more fillers; wherein said elastomer is selected from the group consisting of natural rubber, styrene-butadiene rubber, butadiene rubber, ethylene propylene diene polymers, ethylene-propylene copolymers, butyl rubber, and halobutyl rubbers; wherein said polyindane resin exhibits a glass transition temperature ("Tg") in the range of 10° C. to 150° C.; wherein said polyindane resin comprises a number average molecular weight (Mn) in the range of 300 g/mol to 5,000 g/mol, and wherein there is a substantial absence of polyphenylene ether.

7. The tire component of claim 6, wherein said elastomeric compositions comprises 1 to 100 phr of said polyindane resin.

8. The tire component of claim 6, wherein said elastomeric composition comprises 3 to 60 phr of said polyindane resin.

9. The tire component of claim 6, wherein said polyindane resin is derived from a diisopropenyl-substituted aromatic compound.

10. The tire component of claim 6, wherein said fillers comprise silica, carbon black, or a combination thereof.

11. The tire component of claim 6, wherein said tire component comprises a tire tread, tire subtread, tire undertread, and/or tire sidewall.

* * * * *